(12) United States Patent
Zahir et al.

(10) Patent No.: US 10,105,655 B2
(45) Date of Patent: *Oct. 23, 2018

(54) MEMBRANE REACTOR WITH A TUBULAR PERMEABLE MEMBRANE

(71) Applicant: King Fahd University of Petroleum and Minerals, Dhahran (SA)

(72) Inventors: Md. Hasan Zahir, Dhahran (SA); Alhooshani Khalid, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 15/889,705

(22) Filed: Feb. 6, 2018

(65) Prior Publication Data

US 2018/0161734 A1     Jun. 14, 2018

Related U.S. Application Data

(63) Continuation of application No. 15/176,386, filed on Jun. 8, 2016, now Pat. No. 9,943,808.

(Continued)

(51) Int. Cl.
    *B01D 53/22*      (2006.01)
    *B01D 69/12*      (2006.01)
    (Continued)

(52) U.S. Cl.
    CPC .......... *B01D 69/12* (2013.01); *B01D 53/228* (2013.01); *B01D 67/0093* (2013.01);
    (Continued)

(58) Field of Classification Search
    CPC ................. B01D 69/04; B01D 53/228; B01D 2257/108; B01D 2323/00; B01D 71/56;
    (Continued)

(56) References Cited

U.S. PATENT DOCUMENTS 6,399,528 B1    6/2002    Krell et al.
9,770,688 B2    9/2017    Zahir
                    (Continued)

FOREIGN PATENT DOCUMENTS

EP        0 344 961 B1    1/1993
IN        2012-03768 I1    12/2014
            (Continued)

OTHER PUBLICATIONS

Md. Hasan Zahir, "Preparation of Hydrothermally Stable γ-Alumina-based Composite Mesoporous Membranes and Their Gas Separation Behavior", Proceedings 22$^{nd}$ Saudi Japan Annual Symposium, Catalysts in Petroleum Refining & Petrochemicals, Nov. 25-26, 2012, 5 pages.

(Continued)

*Primary Examiner* — Anthony R Shumate
(74) *Attorney, Agent, or Firm* — Oblon, McClelland, Maier & Neustadt, L.L.P.

(57) ABSTRACT

A semi-porous composite membrane and a method of manufacturing the semi-porous composite membrane. The semi-porous composite membrane includes a base supporting substrate comprising α-$Al_2O_3$, an outer layer comprising silica, and an intermediate layer comprising crystalline fibers of boehmite, and at least one of a secondary metal oxide and a synthetic polymer, wherein the intermediate layer is disposed between the base supporting substrate and the outer layer. The crystalline fibers of boehmite are a length of 5-150 nm. The semi-porous composite membrane may be employed in membrane reactors.

8 Claims, 17 Drawing Sheets

Related U.S. Application Data

(60) Provisional application No. 62/297,504, filed on Feb. 19, 2016.

(51) Int. Cl.
    *B01D 71/56*     (2006.01)
    *B01D 71/40*     (2006.01)
    *B01D 71/62*     (2006.01)
    *B01D 71/52*     (2006.01)
    *B01D 71/38*     (2006.01)
    *B01D 71/02*     (2006.01)
    *B01D 67/00*     (2006.01)
    *B01D 69/10*     (2006.01)
    *B01D 69/04*     (2006.01)

(52) U.S. Cl.
    CPC ............ *B01D 69/04* (2013.01); *B01D 69/10* (2013.01); *B01D 71/025* (2013.01); *B01D 71/027* (2013.01); *B01D 71/38* (2013.01); *B01D 71/40* (2013.01); *B01D 71/52* (2013.01); *B01D 71/56* (2013.01); *B01D 71/62* (2013.01); *B01D 2257/108* (2013.01); *B01D 2323/00* (2013.01); *B01D 2323/08* (2013.01); *B01D 2325/02* (2013.01); *B01D 2325/20* (2013.01)

(58) Field of Classification Search
    CPC .... B01D 71/38; B01D 71/62; B01D 2323/08; B01D 67/0093; B01D 69/12; B01D 71/52; B01D 71/40; B01D 71/025; B01D 2325/02; B01D 71/027; B01D 2325/20; B01D 69/10
    See application file for complete search history.

(56) References Cited

U.S. PATENT DOCUMENTS

| | | | |
|---|---|---|---|
| 9,815,019 B1 | 11/2017 | Zahir | |
| 2003/0118502 A1* | 6/2003 | Wolter | B01D 53/22 423/447.4 |
| 2004/0229027 A1* | 11/2004 | Mori | B01D 53/228 428/212 |
| 2007/0202415 A1 | 8/2007 | Kiefer | |
| 2009/0199619 A1 | 8/2009 | Keller | |
| 2009/0214923 A1* | 8/2009 | Takahashi | B01D 53/228 429/500 |
| 2010/0270239 A1 | 10/2010 | Zhu | |
| 2011/0009256 A1 | 1/2011 | Tsapatsis | |
| 2012/0024777 A1* | 2/2012 | Sugita | B01D 53/228 210/500.25 |
| 2012/0272826 A1 | 11/2012 | Uchikawa | |
| 2013/0189481 A1 | 7/2013 | Grosso | |
| 2013/0240448 A1 | 9/2013 | Sawamura | |
| 2014/0360938 A1* | 12/2014 | Hayashi | C01B 39/48 210/638 |
| 2014/0360939 A1* | 12/2014 | Yamada | B01D 69/02 210/638 |
| 2015/0027306 A1 | 1/2015 | Tan | |
| 2016/0114313 A1* | 4/2016 | Xie | B01D 53/9445 423/213.2 |
| 2016/0214064 A1* | 7/2016 | Gu | B01D 71/028 |
| 2017/0036175 A1* | 2/2017 | Tanabe | B01D 69/04 |
| 2017/0106357 A1* | 4/2017 | Xie | B01J 29/80 |
| 2017/0113179 A1 | 4/2017 | Zahir | |
| 2017/0239624 A1* | 8/2017 | Zahir | B01D 69/12 |
| 2017/0259214 A1* | 9/2017 | Onozuka | B01D 69/12 |

FOREIGN PATENT DOCUMENTS

| | | |
|---|---|---|
| JP | 2004-249264 A | 9/2004 |
| WO | 2008/034190 A1 | 3/2008 |

OTHER PUBLICATIONS

David A. Pacheco Tanaka, et al., "Preparation of "pore-fill" type Pd—YSZ—γ-Al2O3 composite membrane supported on α-Al2O3 tube for hydrogen separation", Journal of Membrane Science, vol. 320, (2008) pp. 436-441.

J.M. Benito, et al., "Preparation and characterization of tubular ceramic membranes for treatment of oil emulsions", Journal of the European Ceramic Society, vol. 25, (2005) pp. 1895-1903.

* cited by examiner

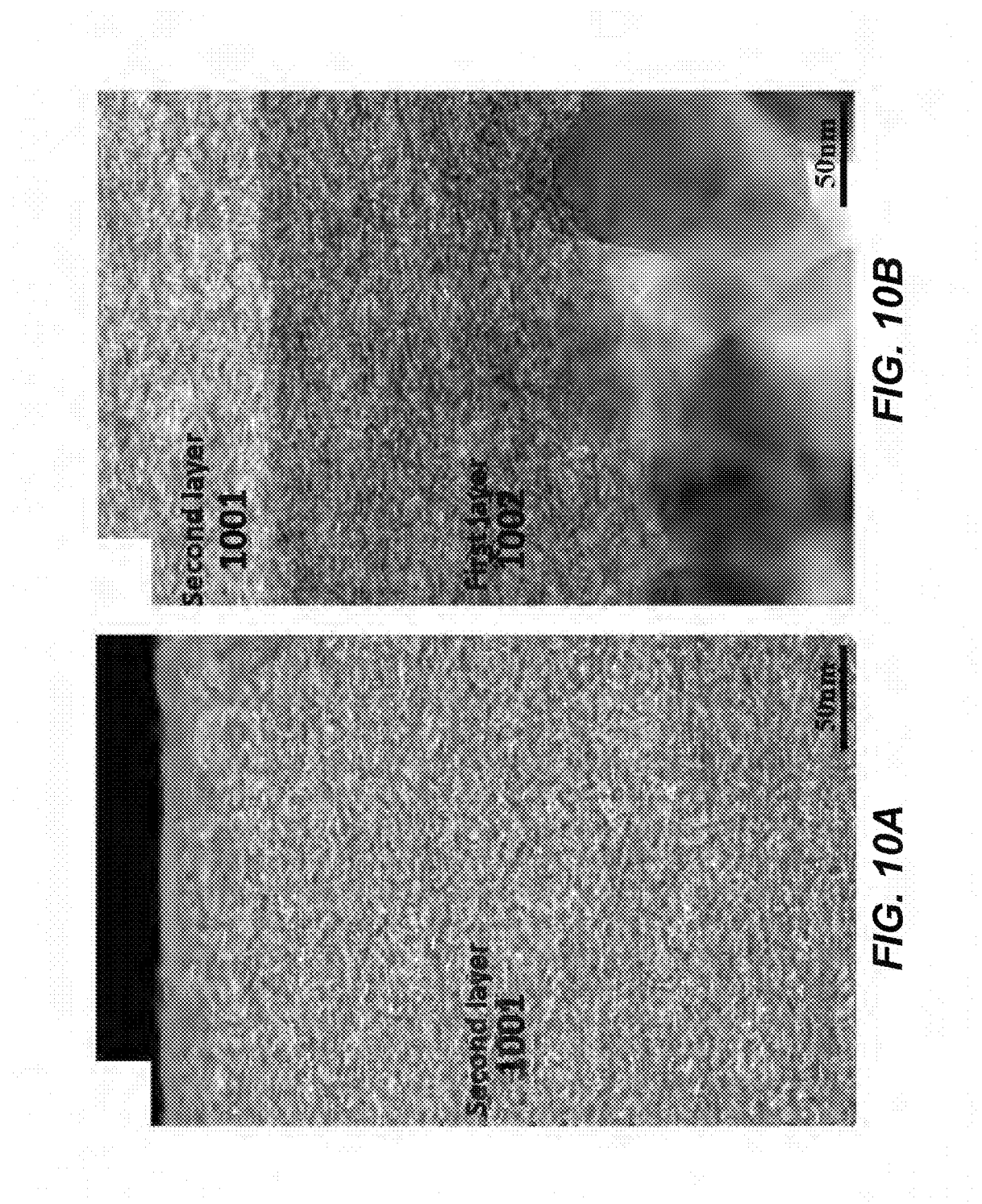

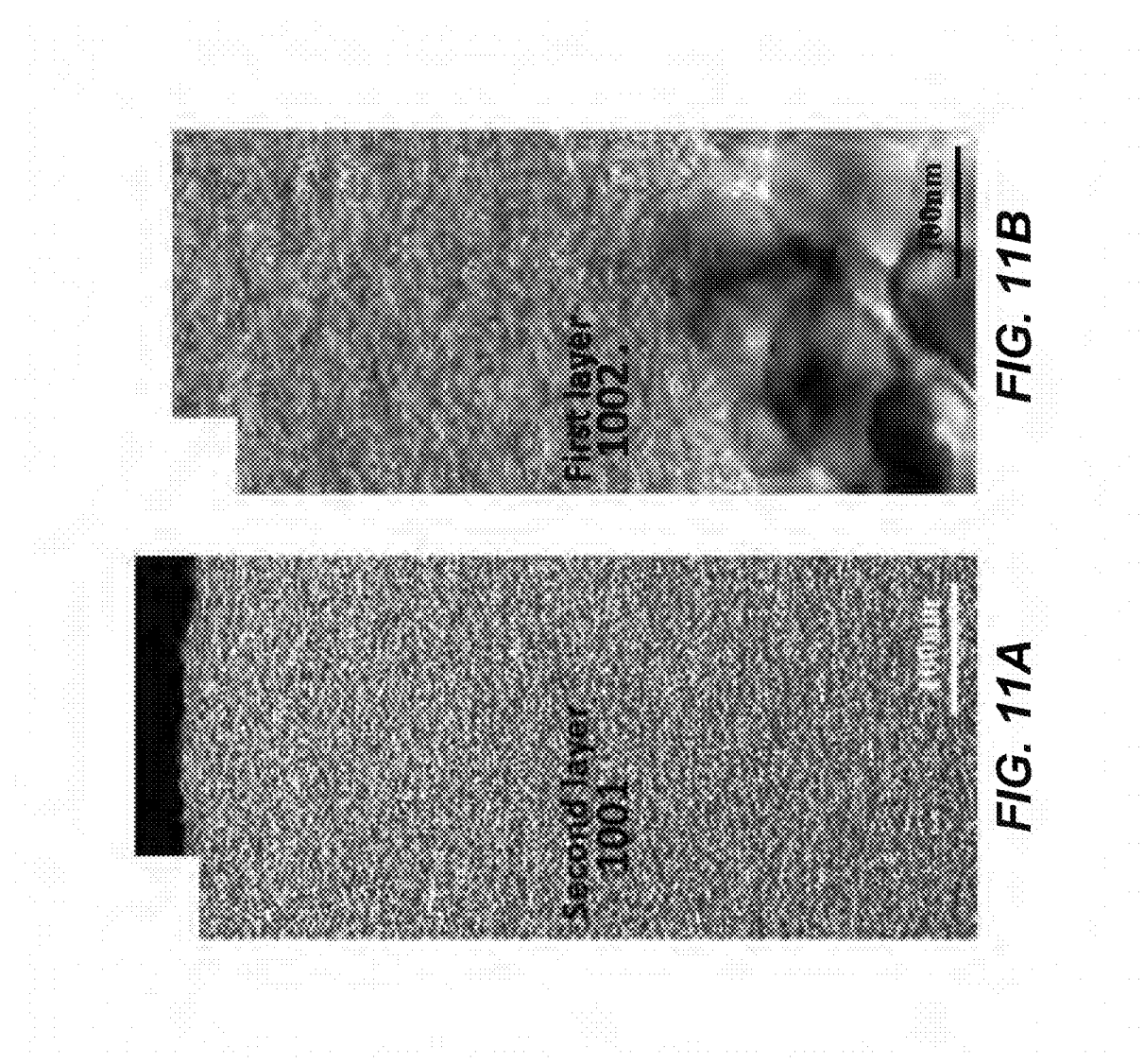

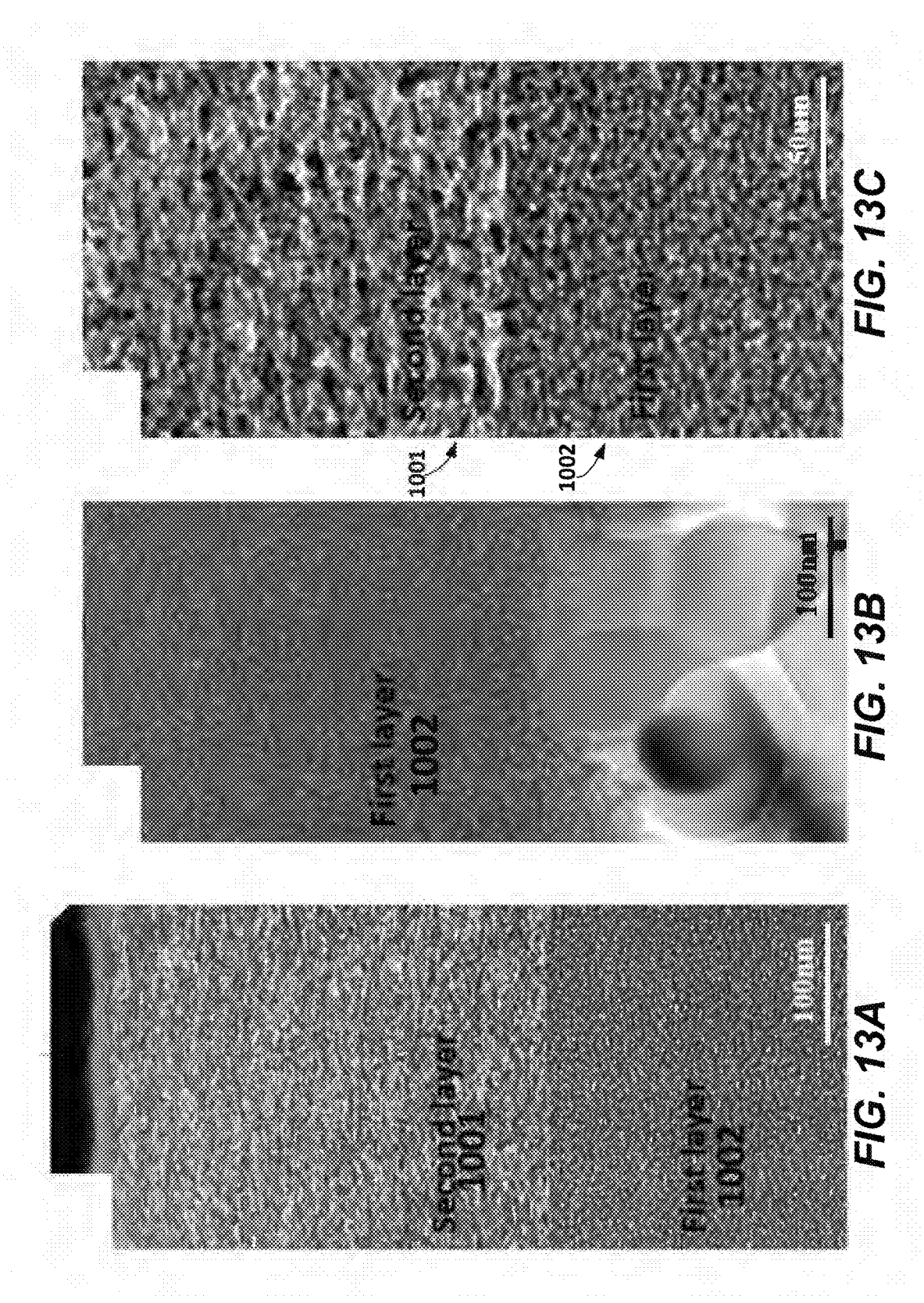

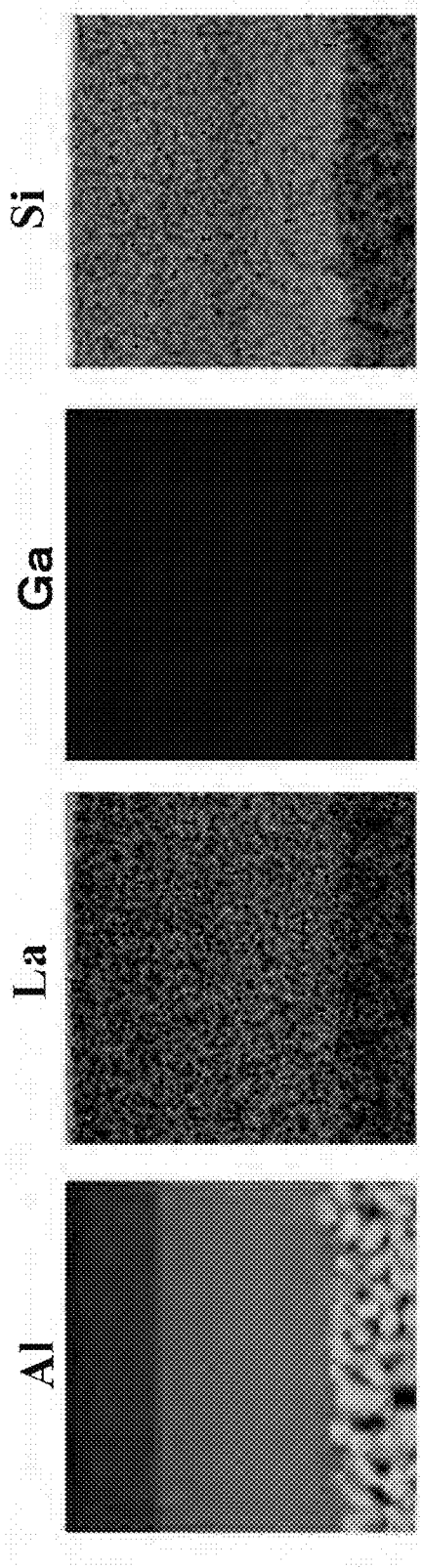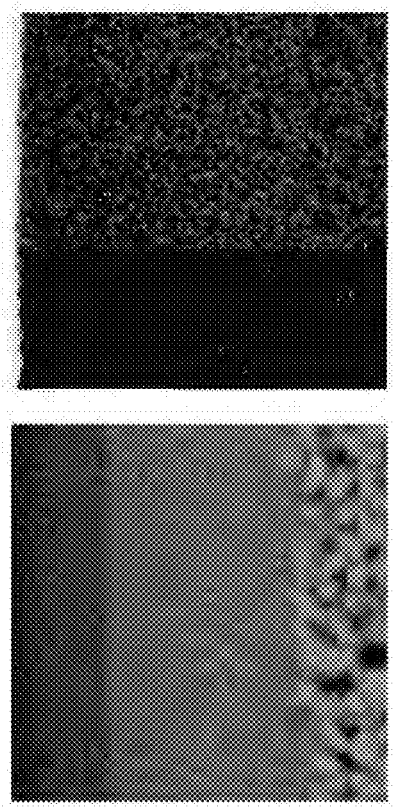
FIG. 16A  FIG. 16B  FIG. 16C  FIG. 16D  FIG. 16E  FIG. 16F  FIG. 16G

MEMBRANE REACTOR WITH A TUBULAR PERMEABLE MEMBRANE

CROSS REFERENCE TO RELATED APPLICATIONS

The present application is a Continuation of Ser. No. 15/176,386, pending, having a filing date of Jun. 8, 2016 and claiming the benefit of priority to provisional application 62/297,504, filed Feb. 19, 2016, the entire contents of each of which are incorporated herein by reference.

BACKGROUND OF THE INVENTION

Technical Field

The present invention relates to the field of membrane reactors and more specifically membrane reactors having a silica outer layer, a $\gamma$-$Al_2O_3$ intermediate layer, and a base supporting substrate of $\alpha$-$Al_2O_3$ substrate. The membrane reactor has gas separation properties upon a hydrothermal treatment.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

It is well established that inorganic membranes are superior to organic membranes for separation processes at high temperatures and pressures, when frequent cleaning is required, and for aggressive chemical, mechanical, or microbiological mixture separations and/or purifications. At least seven-metastable structures including the $\gamma$, $\eta$, $\delta$, $\theta$, $\kappa$, and $\chi$ alumina's, as well as its stable $\alpha$-alumina phase have been reported. See T. M. H. Costa, M. R. Gallas, E. V. Benvenutti, J. A. H. da Jornada, Study of Nanocrystalline $\gamma$-$Al_2O_3$ Produced by High-Pressure Compaction. J. Phys. Chem. B 103 (1999) 4278-4284, incorporated herein by reference in its entirety. Of these, $\gamma$-$Al_2O_3$ has been utilized in many applications, in the form of powder or thin film, as catalysts or catalyst carriers, coating, adsorbents, as well as catalyst supports for cracking, hydrocracking, and hydrodesulfurization of petroleum feed stocks. See K. Wefers, Alumina Chemicals: Science and Technology Handbook (Ed.: L. D. Hart), The American Ceramic Society, Westerville, Ohio, (1990) p. 13, incorporated herein by reference in its entirety. All these processes require high temperatures; water vapor (steam) is usually one of the reactants, or sometimes steam is added to these systems to reduce coke formation. See V. Boffa, D. H. A. Blank, J. E. ten Elshof, Hydrothermal Stability of Microporous Silica and Niobia-Silica Membranes. J. Membr. Sci. 319 (2008) 256-63, incorporated herein by reference in its entirety. Thus, $\gamma$-$Al_2O_3$ catalysts and/or membranes have to withstand the presence of steam and high temperatures. However, very few studies have examined the hydrothermal stability of $\gamma$-$Al_2O_3$, in particular $\gamma$-$Al_2O_3$ membranes on $\alpha$-$Al_2O_3$ supports.

The design of asymmetrically fabricated membranes is highly advantageous for gas separation and water purification applications. This type of membrane can provide high selectivity and acceptable permeability. See R. M. de Vos, H. Verweij, High-Selectivity, High-Flux Silica Membranes for Gas Separation, Science, 279 (1998) 1710-1711, incorporated herein by reference in its entirety. The porous structure of such membranes varies continuously within the membrane thickness according to the variations in the pore structure of the support and the boehmite ($\gamma$-AlOOH) sol concentration. Therefore, membrane morphology and pore structure are crucial to the fabrication of highly selective gas separation membranes especially supported membranes in the presence of steam. State-of-the-art microporous silica membranes can separate hydrogen from other gas molecules. In gas separation membrane fabrication, a mesoporous (2 nm<Ø<0<50 nm) $\gamma$-$Al_2O_3$ membrane is placed between a layer consisting of a silica membrane on the top and an $\alpha$-$Al_2O_3$ porous support on the bottom. The $\gamma$-$Al_2O_3$ layer backing provides mechanical strength to the silica top layer. See Md. H. Zahir, K. Sato, Y. Iwamoto, Development of Hydrothermally Stable SolGel Derived $La_2O_3$-Doped $Ga_2O_3$—$Al_2O_3$ Composite Mesoporous Membrane. J. Membr. Sci. 247 (2005) 95-101; Md. H. Zahir, T. Nagano, High-Selectivity $Y_2O_3$-Doped $SiO_2$ Nanocomposite Membranes for Gas Separation in Steam at High Temperatures. J. Am. Ceram. Soc. 99 (2015) 1-9, each incorporated herein by reference in their entirety. It has also been reported that $\alpha$-$Al_2O_3$-supported $\gamma$-$Al_2O_3$ membranes can be used in gas separation. See F. M. Leenaars, K. Keizer, A. J. Burggraaf, The preparation and characterization of alumina membranes with ultra-fine pores, Part 1 Microstructural investigations on non-supported membranes. J. Mate. Science. 19 (1984) 1077-1088, incorporated herein by reference in its entirety. However, in contrast to the advances made in silica membrane technologies, negligible improvement has been made in the performance of mesostructured $\gamma$-$Al_2O_3$ membranes.

The cross-sectional examination of $\gamma$-$Al_2O_3$ membranes with sophisticated TEM techniques is important to determine the particle arrangement, which is an important feature of the PSD. See T. Z. Ren, Z. Y. Yuan, B. L. Su, Microwave-Assisted Preparation of Hierarchical Mesoporous-Macroporous Boehmite AlOOH and $\gamma$-$Al_2O_3$. Langmuir 20 (2004) 1531-1534, incorporated herein by reference in its entirety. Note that the accurate and realistic characterization of supported membranes is crucial because the morphologies of their pore spaces and particle arrangements strongly affect their flow, transport, reaction, and gas separation properties. See Md. H. Zahir, Y. H. Lkuhara, S. Fujisaki, K. Sato, T. Nagano, Y. Iwamoto, Preparation and characterization of mesoporous ceria-zirconia-alumina nanocomposite with high hydrothermal stability. J. Mater. Res. 22 (2007) 3201-3209; Z. Zhaorong, R. W. Hicks, T. R. Pauly, T. J. Pinnavaia, Mesostructured Forms of $\gamma$-$Al_2O_3$. J. Am. Chem. Soc. 124 (2002) 1592-1593, each incorporated herein by reference in their entirety. The difficulty of characterizing the microstructures of $\gamma$-$Al_2O_3$ thin films and supported $\gamma$-$Al_2O_3$ membranes might be due to the problem of differentiating active pores (membrane) and passive pores (support). See R. Mourhatch, T. T. Tsotsis, M. Sahimi, Deteimination of the true pore size distribution by flow peimporometry experiments: An invasion percolation model. J. Membr. Sci. 367 (2011) 55-62, incorporated herein by reference in its entirety. In addition, the delamination of $\gamma$-alumina membranes from $\alpha$-$Al_2O_3$ supports when exposed to steam or the cracking and peeling-off of the membrane during drying might occur during cross-sectional morphology investigations. It has been claimed that the $N_2$ adsorption-desorption results for non-supported materials, and their microstructural characteristics, are similar to those of supported thin films. The microstructures of $\gamma$-$Al_2O_3$ membranes have been studied by using non-supported films, i.e., by performing powder characterization. It has also been assumed that the characteristics of supported and non-supported membranes are comparable, i.e., the results for non-supported films are expected to be applicable to supported films. See R. J. R. Uhlhorn, M. H. B. J. H. In'tveld, K. Keizer, A. J. Burggraaf, Synthesis of ceramic membranes Part I Synthesis of non-supported and supported γ-alumina membranes without defects. J. Mater. Sci. 27 (1992) 527-537, incorporated herein by reference in its entirety. Vos et al. determined the PSDs of unsupported materials by using the Horrath-Kawazoe method and compared these results with those for supported materials. See R. M. de Vos, Henk Verweij, Improved performance of silica membranes for gas separation, J. Membr. Sci. 143 (1998) 37-51, incorporated herein by reference in its entirety. However, Cao et al. and Cuperus et al. introduced the nano-peimporometry technique in 1993, which can be used to characterize the active pores of the top separation layer (membrane) only. See G. Z. Cao, J. Meijernik, H. W. Brinkman, A. J. Burggraaf, Permporometry study on the size distribution of active pores in porous ceramic membranes, J. Membr. Sci. 83 (1993) 221-235; F. P. Cuperus, D. Bargeman C. A. Smolders, Permporometry. The determination of the size distribution of active pores in UF membranes, J. Membr. Sci. 71 (1992) 57-67, each incorporated herein by reference in their entirety. The nitrogen adsorption-desorption technique is sensitive to both the active and the passive pores. Therefore, the pore size distributions of supported and non-supported membranes are not comparable.

The interpretation of the existing morphological image data for γ-$Al_2O_3$ powders, particularly γ-$Al_2O_3$-supported micro- or meso-porous powders or membranes, is challenging. Most micro-level characterization of γ-$Al_2O_3$ is not systematic, with only very unclear TEM images and very dark and obscure images of color contrast and/or structure available in the open literature. See G. R. Gallaher, P. K. T. Liu, Characterization of ceramic membranes, I. Thermal and hydrothermal stabilities of commercial 40 Å, membranes, J. Membr. Sci. 92 (1994) 29-44; S. J. Wilson, J. D. C. McConnell, M. H. Stacey, Energetics of formation of lamellar porous microstructures in γ-$Al_2O_3$. J. Mater. Sci. 15 (1980) 3081-3090; X. Yang, A. C. Pierre D. R. Uhlmann, Tem study of boehmite gels and their transformation to a-alumina J Non-Cryst. Sol. 100 (1988) 371-377, each incorporated herein by reference in their entirety. For example, the TEM results for boehmite of Saraswati et al. and Leenaars et al. are not identical: Saraswati et al. observed rod-like particles whereas Leenaars et al. observed spherical particles. See V. Saraswati, G. V. N Rao, G. V. R. Rao, Structural evolution in alumina gel, J. Mater. Sci. 22 (1987) 2529-2534, incorporated herein in its entirety. A boehmite sol with plate-shaped crystallites has been also reported. Liu et al. and Tijburg et al. provided very clear TEM images of boehmite that are however very different from those provided by Rao and Leenaars et al. See Q. Liu A. Wang X. Wang, T. Zhang, Mesoporous γ-alumina synthesized by hydro-carboxylic acid as structure-directing agent. Micro. Meso. Mater. 92 (2006) 10-21; I. M. Tijburg, H. D. Bruin, P. A. Elberse, J. W. Geus, Sintering of pseudo-boehmite and γ-$Al_2O_3$. J. Mater. Sci. 26 (1991) 5945 5949, each incorporated herein by reference in their entirety. Liu did not fabricate supported γ-$Al_2O_3$ membranes and thus did not present cross-sectional membrane morphology images. Gallaher et al. presented very unclear TEM images in which nothing was visible. The TEM images provided by Wilson et al. were also very dark, making it hard to examine particle morphologies. Recently, Gaber et al. presented TEM images of γ-$Al_2O_3$, but these images are very unclear and appear to show very thick acicular-type particles. See A. A. A. Gaber, D. M. Ibrahim, F. F. A. Almohsen, E. M. El-Zanati, Synthesis of alumina, titania, and alumina-titania hydrophobic membranes via solgel polymeric route. J. Anal. Sci. Tech. 4 (2013) 1-20, incorporated herein by reference in its entirety.

Many groups have reported the thermal stability of γ-$Al_2O_3$ by using thermal stabilizing modifiers such as $Zr^{4+}$, $Ca^{2+}$, $Th^{4+}$, and $La^{3+}$. Of these, $La^{3+}$ is quite effective, opposite trend could be obtained by using $In^{3+}$, $Ga^{3+}$, and $Mg^{2+}$ metal ions. See M. Trueba, S. P. Trasatti, γ-Alumina as a Support for Catalysts: A Review of Fundamental Aspects, Eur. J. Inorg. Chem. (2005) 3393-3403, incorporated herein by reference in its entirety. Zahir et al. have investigated the effects on the thermal and hydrothermal stability of γ-$Al_2O_3$ membranes of the addition of $La_2O_3$ prepared with the sol-gel method.

In view of the forgoing, the objective of the present disclosure is to present a semi-porous composite membrane and a method of making thereof.

BRIEF SUMMARY OF THE INVENTION

According to a first aspect the present disclosure describes a semi-porous composite membrane having a base supporting substrate comprising α-$Al_2O_3$, an outer layer comprising silica, and an intermediate layer comprising crystalline fibers of γ-$Al_2O_3$ which are a length of 5-150 nm and at least one of a secondary metal oxide and a synthetic polymer. The intermediate layer is disposed between the base supporting substrate and the outer layer. The the semi-porous composite membrane has a penleance of $2.0 \times 10^{-8}$ mol·$m^{-2}$·$s^{-1}$·$Pa^{-1}$ to $3.0 \times 10^{-7}$ mol·$^{-2}$·$s^{-1}$·$Pa^{-1}$ for He, $H_2$ from at least one gas of Ar, $N_2$, and CO In some embodiments of the semi-porous composite membrane, the secondary metal oxide is at least one metal oxide selected from the group consisting of lanthanum oxide, zirconium dioxide, calcium oxide, and gallium oxide.

In some embodiments of the semi-porous composite membrane, base supporting substrate is a tubular-shaped support.

In some embodiments of the semi-porous composite membrane, the tubular-shaped support has a length of 1 cm to 10 cm, an outer diameter of 0.1 cm to 1 cm, and an inner diameter of 0.05 cm to 0.9 cm.

In some embodiments of the semi-porous composite membrane, the base supporting substrate is a porous base supporting substrate.

In some embodiments of the semi-porous composite membrane, the porous base supporting substrate comprises pores having an average diameter of 50 nm to 160 nm.

In some embodiments of the semi-porous composite membrane, the intermediate layer comprises pores of which 70%-95% of a total number of the pores have a pore size distribution from 2 nm to 70 nm.

In some embodiments of the semi-porous composite membrane, the outer layer is a silica membrane.

In some embodiments of the semi-porous composite membrane, the silica membrane is a porous silica membrane comprising pores having an average pore diameter of 0.1 nm to 2 nm.

In some embodiments of the semi-porous composite membrane, the synthetic polymer is at least one polymer selected from the group consisting of polyvinyl alcohol, polyethylene glycol, polyvinyl pyrrolidone, polyacrylic acid, polyacrylamide, poly(N-(2-hydroxypropyl) methacrylamide), and polyoxazoline.

According to a second aspect, the present disclosure further describes a method of manufacturing a semi-porous composite membrane, which includes preparing an intermediate layer coating mixture, in which the intermediate layer coating mixture includes a boehmite sol gel, and/or a secondary metal oxide-forming compound, and/or 1-10 wt % of a synthetic polymer relative to a weight of the intermediate layer coating mixture, contacting a base supporting substrate comprising α-$Al_2O_3$ with the intermediate layer coating mixture to form a coated substrate, calcining the coated substrate in air at a temperature of 500° C. to 700° C. for 45 minutes 2 hours, with a rate of heating and a rate of cooling of 0.5° C./min-3° C./min, preparing a silica sol gel mixture, wherein the silica sol gel mixture comprises a hydrolyzed and condensed tetraethyl orthosilicate, ethanol and is a pH of 1 to 3, contacting the coated substrate with the silica sol gel mixture to form a silica coated substrate, calcining the silica coated substrate in air at a temperature of 500° C. to 700° C. for 45 minutes 2 hours, with a rate of heating and a rate of cooling of 0.5° C./min 3° C./min, which forms an outer layer, and treating the silica coated substrate with a hydrothermal process under a nitrogen gas to steam mixture to form the semi-porous composite membrane. The semi-porous composite membrane has a permeance of $4.0 \times 10^{-8}$ $mol \cdot m^{-2} \cdot s^{-1} \cdot Pa^{-1}$ to $1.0 \times 10^{-6}$ $mol \cdot m^{-2} \cdot s^{-1} \cdot Pa^{-1}$ for He, $H_2$ from at least one gas of Ar, $N_2$, and CO at a temperature range of 100° C. 600° C.

In some implementations, the method further includes repeating the contacting of the coated substrate with the intermediate layer coating mixture and calcining of the coated substrate.

In some implementations, the method further includes repeating the contacting of the silica coated substrate with the silica sol gel mixture and the calcining of the silica coated substrate.

In some implementations of the method, the synthetic polymer is at least one polymer selected from the group consisting of polyvinyl alcohol, polyethylene glycol, polyvinyl pyrrolidone, polyacrylic acid, polyacrylamide, poly (N-(2-hydroxypropyl) methacrylamide), and polyoxazoline.

In some implementations of the method, a ratio of nitrogen gas to steam in the nitrogen gas to steam mixture is 1:2 to 1:4 and the hydrothermal process is conducted at a temperature of 350° C.-650° C.

In some implementations of the method, the hydrothermal process may be a pulsed process or a continuous process.

In some implementations, the method further includes pre-heating the silica coated substrate to a temperature of 500° C. to 700° C. for 0.5 hour to 1.5 hours immediately before treating the silica coated substrate with the hydrothermal process.

In some implementations of the method, the secondary metal oxide-forming compound is at least one selected from the group consisting of lanthanum nitrate, zirconium nitrate, calcium nitrate, and gallium nitrate, and hydrates thereof.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 10A is a bright-field TEM image of a semi-porous composite membrane near the outer layer;

FIG. 10B is a bright-field TEM image of a semi-porous composite membrane near a base supporting substrate;

FIG. 11A is a bright-field TEM image of a semi-porous composite membrane near the outer layer after hydrothermal treatment;

FIG. 11B is a bright-field TEM image of a semi-porous composite membrane near a base supporting substrate after hydrothermal treatment;

FIG. 13A is an HRTEM image of a semi-porous composite membrane including $La_2O_3$ and γ-$Al_2O_3$, near the outer layer after hydrothermal treatment;

FIG. 13B is an HRTEM image of a semi-porous composite membrane including $La_2O_3$ and γ-$Al_2O_3$, near a base supporting substrate after hydrothermal treatment;

FIG. 13C is an HRTEM image of a semi-porous composite membrane including $La_2O_3$ and γ-$Al_2O_3$ between a base supporting substrate and an intermediate layer after hydrothermal treatment;

FIG. 16A is an energy dispersive spectroscopy (EDS) image of aluminum in a semi-porous composite membrane;

FIG. 16B is an energy dispersive spectroscopy (EDS) image of lanthanum in a semi-porous composite membrane;

FIG. 16C is an energy dispersive spectroscopy (EDS) image of gallium in a semi-porous composite membrane;

FIG. 16D is an energy dispersive spectroscopy (EDS) image of silicon in a semi-porous composite membrane;

FIG. 16E is an energy dispersive spectroscopy (EDS) image of oxygen in a semi-porous composite membrane;

FIG. 16F is an energy dispersive spectroscopy (EDS) image of tungsten in a semi-porous composite membrane; and FIG. 16G is a bright-field image of a semi-porous composite membrane.

DETAILED DESCRIPTION OF THE EMBODIMENTS

Figure 2:
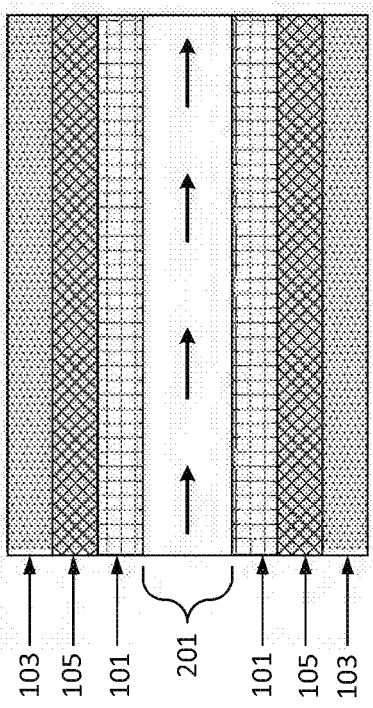
FIG. 2 is an exemplary schematic of the longitudinal cross section of an exemplary semi-porous composite membrane.

Throughout the specification ranges may be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Referring now to the drawings, wherein like reference numerals designate identical or corresponding parts throughout the several views.

Figure 1:
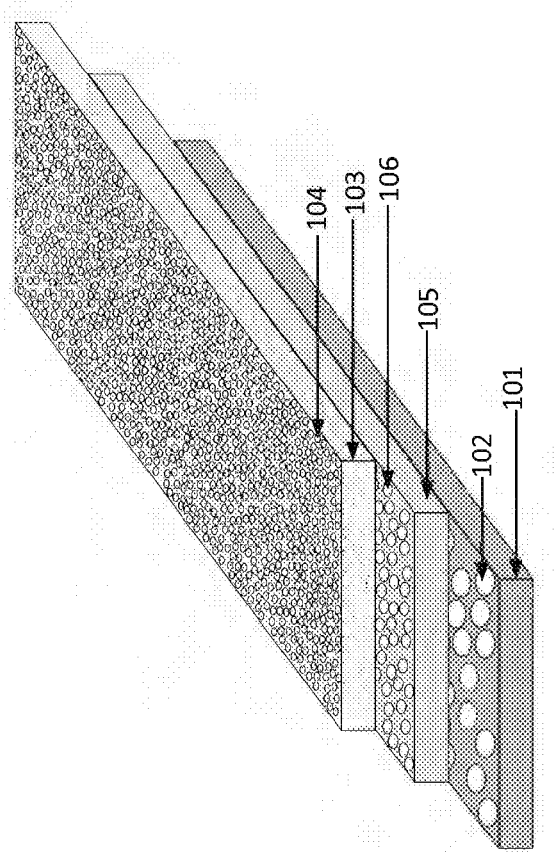
FIG. 1 is a schematic drawing of the axial cross section of an exemplary semi-porous composite membrane.

The present disclosure relates to a semi-porous composite membrane having a base supporting substrate comprising $\alpha$-$Al_2O_3$, an outer layer comprising silica, and an intermediate layer comprising crystalline fibers of $\gamma$-$Al_2O_3$, which are a length of 5-150 nm, and at least one of a secondary metal oxide and a synthetic polymer. The intermediate layer is disposed between the base supporting substrate and the outer layer. The semi-porous composite membrane has a permeance of $2.0\times10^{-9}$ $mol\cdot m^{-2}\cdot s^{-1}\cdot Pa^{-1}$ to $3.0\times10^{-6}$ $mol\cdot m^2\cdot s^{-1}\cdot Pa^{-1}$ for He and $H_2$ from at least one gas of: r, $N_2$, and/or CO. An exemplary cross section of the semi-porous composite membrane is depicted in FIG. 1 with the base supporting substrate 101, the outer layer 103, and the intermediate layer 105.

The semi-porous composite membrane described herein may be employed in membrane reactors. A membrane reactor is typically a pipe-like tube that can separate a component of a mixture through a porous membrane and may also catalyze a reaction during the process of separation. Examples of components that can diffuse through a membrane reactor may be gas molecules or ions, whereas macromolecules, proteins and polymers may be excluded from a membrane reactor. Membrane reactors often operate in high temperatures, but the reaction atmospheres usually contain considerable amounts of steam either because water is one of the reactants or because water is added to reduce carbonaceous deposit formation. Thus, in many applications the membrane reactors must be sufficiently stable in environments with both increased temperature and high steam content.

A microporous silica membrane is one exemplary candidate for a layer of a membrane reactor. Generally, a microporous silica-based membrane can be fabricated on a porous support, which is discussed herein. The outer layer of the semi-porous composite membrane of the present disclosure, in some embodiments, comprises silica. The silica of the outer layer 103 may be in the form of a permeable membrane. The silica layer or permeable membrane is porous in some embodiments, and may have pores of an average pore diameter of about 0.1 nm to about 2 nm, about 0.2 nm to about 1.8 nm, about 0.5 nm to about 1.5 nm, about 0.8 nm to about 1.2 nm, about 0.9 nm to about 1.1 nm. Pores 104 of an exemplary silica layer as the outer layer 103 of the semi-porous composite membrane are depicted in FIG. 1. A thickness of the outer layer may be 80 nm-110 nm, 90 nm-100 nm, and 94 nm to 96 nm.

The base supporting substrate 101 of the semi-porous composite membrane may be a tubular-shaped support having a hollow section along a longitudinal length of the base supporting substrate 101. A tubular shape of the base supporting substrate enables the flow of gases around the tubular shape and through the hollow section of the tube 201, as depicted in FIG. 2, as may be the case with a membrane reactor. The tubular shape may be a circular, cubic, or other polygon cylinder shape. In some embodiments of the semi-porous composite membrane, the tubular-shaped support may have a length of about 1 cm to 10 cm, about 2 cm to 8 cm, about 5 cm to 6 cm. In some embodiments, the tubular-shaped support may have an outer diameter of about 0.1 cm to 1 cm, about 0.5 cm to 0.8 cm, or about 0.6 cm to about 0.75 cm. In some embodiments, the tubular-shaped support may have an inner diameter of about 0.05 cm to 0.9 cm, about 0.1 cm to 0.8 cm, about 0.3 cm to 0.6 cm, or about 0.4 cm to 0.5 cm. In some embodiments, the base supporting substrate is a porous base supporting substrate that comprises pores 102 having an average diameter of about 50 nm to 160 nm, about 60 nm to 140 nm, about 70 nm to 120 nm, about 80 nm to 100 nm.

In some embodiments, the base supporting substrate may further include a catalyst, such as palladium or platinum. In some embodiments, the catalyst may be integrated into the base supporting substrate, at a coating on a surface of the base supporting substrate, or both. In some embodiments the base supporting substrate may further include alternate phases of aluminum oxide, excluding $\gamma$-$Al_2O_3$, such as a $\eta$ phase, the monoclinic $\theta$ phase, the hexagonal $\chi$ phase, the orthorhombic $\kappa$ phase and the $\delta$ phase. A thickness of the base supporting substrate may be 7 µm-12 µm, 8 µm-10 µm, or 8.5 µm-9.5 µm.

The intermediate layer comprises $\gamma$-$Al_2O_3$ and may include at least one of the secondary metal oxide and the synthetic polymer. In some embodiments of the semi-porous composite membrane, the secondary metal oxide is at least one metal oxide selected from the group consisting of lanthanum oxide, zirconium dioxide, calcium oxide, and gallium oxide. The metal oxide may serve as a support for the silica membrane to prevent fracturing and cracking during use of the semi-porous composite membrane. Further the secondary metal oxide may be in a mol % relative to $\gamma$-$Al_2O_3$ of about 3%-45%, about 10%-40%, about 15%-35%, or about 20%-30%. In some embodiments, lanthanum oxide and gallium oxide are in ratio with the $\gamma$-$Al_2O_3$ in a mol % ratio of 6:30:64, respectively. It is known that transition aluminas, such as $\gamma$-$Al_2O_3$, are metastable phases that gradually transform into $\alpha$-$Al_2O_3$ during high temperature use of a membrane reactor and including a secondary metal oxide in the intermediate layer may improve the stability of the $\gamma$-$Al_2O_3$ and reduce deterioration, such as hydrothermal deterioration. A thickness of the intermediate layer may be 2.5 μm-5.5 μm, 3 μm-5 μm, or 3.5 μm-4.5 μm.

The intermediate layer comprises $\gamma$-$Al_2O_3$, which is in the form of crystalline fibers of the length of 5-150 nm. In some embodiments, the crystalline fibers are found at intermediate lengths of about 10 nm to 125 nm, about 20 nm to 110 nm, about 30 nm to about 100 nm, about 40 nm to 90 nm, about 50 nm to 80 nm, or about 60 nm to 70 nm. The crystalline fibers may be long needle like structures or rod like structures. The crystalline fibers may further be a single strand or multiple strands of interlaced $\gamma$-$Al_2O_3$. The thickness of the individual fibers may be about 0.1 nm to 15 nm, about 1 nm to 12 nm, about 5 nm to 10 nm, or about 7 nm to 8 nm. The crystalline fibers of $\gamma$-$Al_2O_3$ may increase adherence to the silica layer, and may retain the distinctive layer delineation in the semi-porous composite membrane to prepare crack-free and uniformity or homogeneity in the thickness of the layers. The importance of preventing cracks and fissures in the membrane is to avoid gas leakage which may lead to ineffective gas separation of the semi-porous composite membrane. The In some embodiments, the intermediate layer may include at least one synthetic polymer selected from the group consisting of polyvinyl alcohol, polyethylene glycol, polyvinyl pyrrolidone, polyacrylic acid, polyacrylamide, poly (N-(2-hydroxypropyl) methacrylamide), and polyoxazoline. The synthetic polymer may be a weight percentage of the intermediate layer of about 1% to 10%, about 2% to 9%, about 3% to 8%, about 4% to 7%, or about 5% to 6%. In some embodiments, synthetic polymer of the present disclosure is uniformly dispersed within the intermediate layer. In some embodiments, the synthetic polymer is dispersed between molecules of the metal oxides and boehmite. When the secondary metal oxide and the synthetic polymer are present, the weight ratio of the synthetic polymer and the secondary metal oxide is about 1:1-1:6, about 1:2-1:5, or about 1:3-1:4.

In some embodiments of the semi-porous composite membrane, there may be at least 1 inter mediate layer, at least 2 intermediate layers, at least 3 intermediate layers, at least 4 intermediate layers, but no more than 5 inter mediate layers. In some embodiments of the semi-porous composite membrane, when the semi-porous composite membrane has two or more irate, mediate layers, each intermediate layer may comprise different secondary metal oxides in each layer.

In some embodiments, the intermediate layer comprises pores. In some embodiments, the pores of which about 70% to 95%, about 75% to 95%, about 80% to 95%, or about 85% to 95% of a total number of the pores have a pore size distribution from 2 nm to 70 nm, about 3 nm to 60 nm, about 4 nm to 50 nm, about 5 nm to 40 nm, about 10 nm to 30 nm, or about 15 nm to 20 nm. The intermediate layer may be referred to as a mesoporous membrane.

The mesoporous membrane or intermediate $\gamma$-$Al_2O_3$ layer provides the silica top layer with mechanical strength. Further, differing pore sizes in each of the layers imparts variations in morphology with in the semi-porous composite membrane creating interparticle porous networks of tortuous pathways through which different gaseous particles may be separated. For example, an interparticle porous network that may be taken for $H_2$ may be different from a pathway for $N_2$, which expands the utility of one semi-porous composite membrane for multiple gas separations.

In some embodiments of the semi-porous composite membrane of the present disclosure has a permeance for He and $H_2$ from at least one gas of Ar, $N_2$, and CO of about $4.0\times10^{-8}$ mol·m$^{-2}$·s$^{-1}$·Pa$^{-1}$ to $1.0\times10^{-6}$ mol·m$^{-2}$·s$^{-1}$·Pa$^{-1}$, about $5\times10^{-8}$ mol·m$^{-2}$·s$^{-1}$·Pa$^{-1}$ to $9\times10^{-7}$ mol·m$^{-2}$·s$^{-1}$·Pa$^{-1}$, or about $7\times10^{-8}$ mol·m$^{-2}$·Pa$^{-1}$ to $8.0\times10^{-7}$ mol·m$^{2}$·s$^{-1}$·Pa$^{-1}$. The gas mixture may include gases such as, but not limited to steam, argon, nitrogen, carbon dioxide, oxygen, carbon monoxide, helium, hydrogen, and hydrogen sulfide. In some embodiments, the semi-porous composite membrane of the present disclosure has a permeance for Ar, $N_2$, and CO of about $1\times10^{-9}$ mol·m$^{-2}$·s$^{-1}$·Pa$^{-1}$ to $3.0\times10^{-8}$ mol·m$^{-2}$·s$^{-1}$·Pa$^{-1}$, about $3\times10^{-9}$ mol·m$^{-2}$·s$^{-1}$·Pa$^{-1}$ to $9\times10^{-9}$ mol·m$^{-2}$·s$^{-1}$·Pa$^{-1}$ about $4\times10^{-9}$ mol·m$^{-2}$·s$^{-1}$·Pa$^{-1}$ to $8\times10^{-9}$ mol m$^{-2}$·s$^{-1}$·Pa$^{-1}$, or about $6\times10^{-9}$ mol·m$^{-2}$·s$^{-1}$·Pa$^{-1}$ to $7\times10^{-9}$ mol·m$^{-2}$·s$^{-1}$·Pa$^{-1}$. The semi-porous composite membrane has a very low permeance (less than $1\times10^{-9}$ mol·m$^{-2}$·s$^{-1}$·Pa$^{-1}$) for Ar, $N_2$, and CO, and high permeance (above $2.0\times10^{-8}$ mol·m$^{-2}$·Pa$^{-1}$) for He and $H_2$.

According to a second aspect, the present disclosure further describes a method of manufacturing a semi-porous composite membrane. The method of manufacturing the semi-porous composite membrane may begin with preparing an intermediate layer coating mixture.

The intermediate layer coating mixture includes preparing a boehmite ($\gamma$-$Al_2O_3$) sol gel. A sol gel of the boehmite may be prepared by adding 0.1 M-2 M, about 0.2 M-1.8 M, about 0.3 M-1.7 M, about 0.4 M-1.6 M, about 0.5 M-1.5 M, about 0.6 M-1.4 M, about 0.7 M-1.3 M, about 0.8 M-1.2 M, about 0.9 M-1.2 M, or about 1.0 M-1.1 M of an aluminum alkoxide (e.g. aluminum-trisec-butoxide) into distilled water. The alkoxide solution may be stirred or mixed while under reflux conditions at a temperature of 70° C.-95° C., 75° C.-90° C., or 80° C.-85° C. to form a boehmite sol gel. In some implementations, a pH of the sol gel of boehmite may be adjusted with an acid to be a pH of 1-9, about 2-7, or about 3-5. The acid may be at least one of $HNO_3$, $H_2SO_4$, or HCl. The sol gel of boehmite may be refluxed for about 9 h-15 h, about 10 h-14 hr, or about 11 h-13 h. In some implementations, the sol gel of boehmite may be combined with an aqueous solution of at least one secondary metal oxide-forming compound. Examples of the secondary metal-oxide forming compounds that may be combined with the sol gel of boehmite may include, but are not limited to lanthanum nitrate hexahydrate, zirconium nitrate pentahydrate, calcium nitrate hydrate, and gallium nitrate hydrate. The ratio of the metal compounds and the boehmite may be about 5:95-45:55, about 10:90-40:60, about 15:85-35:65, about 20:80-30:70.

In some implementations, the synthetic polymer as described herein may be added to the sol gel of boehmite. The synthetic polymer may be a weight percentage of the sol gel of boehmite of about 1% to 15%, about 2% to 10%, about 3% to 8%, about 4% to 7%, or about 5% to 6%. In some embodiments, synthetic polymer of the present disclosure is uniformly dispersed within the sol gel of boehmite by vigorous mixing, blending, or stirring. The sol gel of boehmite, which may further include at least one of the secondary metal-oxide forming compound and the synthetic polymer, forms the intermediate layer coating mixture.

The base supporting substrate comprising $\alpha$-$Al_2O_3$ contacts the intermediate layer coating mixture, to form a coated substrate. The contacting may include, but is not limited to dipping, spraying, brushing, and spin-coating to uniformly cover an exterior surface of the base supporting substrate comprising $\alpha$-$Al_2O_3$ with the intermediate layer coating mixture.

The coated substrate may be calcined in air at a temperature of 500° C. to 700° C., 550° C. to 650° C., or about 600° C. to 625° C. The calcining may continue for about 45 minutes-2 hours or about 1 hour-1.5 hours. The calcining may include a rate of heating, a rate of cooling, or both, of about 0.5° C./min-3° C./min, about 0.75° C./min 2.5° C./min, about 1° C./min-2° C./min, or about 1.25° C./min 1.5° C./min. The secondary metal-oxide forming compounds form into the secondary metal oxides as described herein, during the calcining through a thermal decomposition process. The thermal decomposition process is a chemical decomposition caused or catalyzed by heat. In some implementations, the method further includes repeating the contacting of the coated substrate with the intermediate layer coating mixture and calcining of the coated substrate. In some implementations, the method further includes repeating the contacting of the coated substrate with an intermediate layer coating mixture that is different from the intermediate layer coating mixture of a previous intermediate layer, and calcining of the coated substrate.

The coated substrate may then be contacted with a silica sol gel mixture. The silica sol gel mixture may be prepared by combining a silicate ester (i.e. tetraethyl orthosilicate, tetramethyl orthosilicate), and an alcohol to form a solution of a concentration of 0.5 M to 5 M, 0.6 M to 4 M, 0.7 M to 3 M, 0.8 M to 2 M, or 1 M to 1.5 M, then adjusting a pH by adding an acid to 1 to 3, 1.5-2.5, or 1.75-2.25. The acid may be as described herein. Adjusting the pH may catalyze a silicate ester to undergo hydrolysis to silanol and condensation to form a bridging oxygen or a siloxane group. The hydrolysis and condensation of a silicate ester forms a silica sol gel mixture. Contacting the coated substrate with the silica sol gel mixture forms a silica coated substrate. The silica coated substrate may then be calcined.

The silica coated substrate may be calcined in air at a temperature of 500° C. to 700° C., 550° C. to 650° C., or about 600° C. to 625° C. The calcining may continue for about 45 minutes 2 hours or about 1 hour-1.5 hours. The calcining may include a rate of heating and a rate of cooling of about 0.5° C./min-3° C./min, about 0.75° C./min 2.5° C./min, about 1° C./min-2° C./min, or about 1.25° C./min 1.5° C./min. The calcining of the silica coated substrate forms the outer layer, as described herein. In some implementations, the method further includes repeating the contacting of the silica coated substrate with the silica sol gel mixture and the calcining of the silica coated substrate.

The silica coated substrate after undergoing calcining, may be treated with a hydrothermal process under a nitrogen gas to steam mixture to form the semi-porous composite membrane. The hydrothermal process, or hydrothermal treatment, exposes the silica coated substrate with a high temperature and a high pressure steam and gas environment. An example of a vessel that may be used in a hydrothermal process is an autoclave. In some implementations of the method, a ratio of nitrogen gas to steam in the nitrogen gas to steam mixture is about 1:2 to 1:4 or about 1:3 to 1:3.5. In some implementations of the method, the hydrothermal process is conducted at a temperature of about 350° C.-650° C., about 400° C.-600° C., about 450° C.-550° C., or about 475° C.-525° C. Treating the silica coated substrate with the hydrothermal process forms the semi-porous composite membrane.

The semi-porous composite membrane has a permeance of about $4.0 \times 10^{-8}$ mol·$m^{-2}$·$s^{-1}$·$Pa^{-1}$ to $1.0 \times 10^{-6}$ mol·$m^{-2}$·$s^{-1}$·$Pa^{-1}$, about $5 \times 10^{-8}$ mol·$m^{-2}$ $s^{-1}$·$Pa^{-1}$ to $9 \times 10^{-7}$ mol·$m^{-2}$·$s^{-1}$·$Pa^{-1}$, or about $7 \times 10^{-8}$ mol·$m^{-2}$·$s^{-1}$·$Pa^{-1}$ to $8.0 \times 10^{-7}$ mol·$m^{-2}$·$s^{-1}$·$Pa^{-1}$. for He and $H_2$ from at least one gas of Ar, $N_2$, and CO from a gas mixture at a temperature range of about 100° C. 600° C., about 200° C. 500° C., or about 300° C. 400° C. In some embodiments, the semi-porous composite membrane of the present disclosure has a permeance for Ar, $N_2$, and CO of about $1 \times 10^{-9}$ mol·$m^{-2}$·$s^{-1}$·$Pa^{-1}$ to $1.0 \times 10^{-8}$ mol·$m^{-2}$·$s^{-1}$·$Pa^{-1}$, about $3 \times 10^{-9}$ mol·$m^{-2}$·$s^{-1}$·$Pa^{-1}$ to $9 \times 10^{-9}$ mol·$m^{-2}$·$s^{-1}$·$Pa^{-1}$, about $4 \times 10$ mol·$m^{-2}$·$s^{-1}$·$Pa^{-1}$ to $8 \times 10^{-9}$ mol·$m^{-2}$ $s^{-1}$·$Pa^{-1}$, or about $6 \times 10^{-9}$ mol·$m^{-2}$·$s^{-1}$·$Pa^{-1}$ to $7 \times 10^{-9}$ mol·$m^{-2}$·$s^{-1}$·$Pa^{-1}$. The semi-porous composite membrane has a very low permeance (less than $1 \times 10^{-9}$ mol·$m^{-2}$·$s^{-1}$·$Pa^{-1}$) for Ar, $N_2$, and CO, and high permeance (above $4.0 \times 10^{-8}$ mol·$m^{-2}$ $s^{-1}$·$Pa^{-1}$) for He and $H_2$. The gas mixture is as described herein. In some implementations of the method, the hydrothermal process may be a pulsed process or a continuous process. The pulsed process may include gaps throughout the duration of the hydrothermal process. The gaps may be regular, irregular or both. For example, a regular gap may be described by a 5 minute stoppage in the hydrothermal treatment every 10 minutes during the hydrothermal process. For example, an irregular gap, may be described by a 1-10 minute stoppage in the hydrothermal treatment after 8 minutes, 10 minutes, 25 minutes, or 30 minutes during the hydrothermal process. The continuous process does not include any gaps or pauses throughout the duration of the hydrothermal process. The duration of the hydrothermal process was from 10 hours to 120 hours, 20 hours to 100 hours, 40 hours to 80 hours, 50 hours to 70 hours, and 55 hours to 65 hours.

In some implementations, the method further includes a pre-heating of the silica coated substrate to a temperature of 500° C. to 700° C. for 0.5 hour to 1.5 hours immediately before treating the silica coated substrate with the hydrothermal process.

The examples below are intended to further illustrate an exemplary semi-porous composite membrane and a method of manufacturing an exemplary semi-porous composite membrane and are not intended to limit the scope of the claims.

Example 1

Materials Synthesis

By adding 0.6 mol of aluminum-trisec-butoxide (Al(O-s-Bu)3=ATSB, 97% Aldrich, USA) into distilled water, the boehmite sols were prepared at 90° C. The pH of the solution was adjusted with 1 M $HNO_3$. Then the solution was refluxed for 12 h at 90° C. An aqueous solution of La($NO_3$)$_3$.6 $H_2O$ (Aldrich, USA) was added to the boehmite solution. The La:Al starting nitrates ratio was 6:94 mol introduced 6 mol % lanthanum nitrate onto the surface of $\gamma$-$Al_2O_3$, and found that complete crystalline $La_2O_3$ clusters were present after the addition of 10 mol % into the doped membranes precursor. See H. Schaper, E. B. M. Doesburg, L. L. v.

Reijen, The Influence of Lanthanum Oxide on the Thermal Stability of Gamma-Alumina Catalyst Supports. Appl. Catal. 7 (1983) 211-20, incorporated herein by reference in its entirety.

Intermediate Mesoporous Membrane Fabrication

After adding the boehmite sol (γ-AlOOH) and a 3.5 wt % solution of poly vinyl alcohol ((PVA), Kanto Chemical, Japan; MW=72,000) the solution was refluxed at 90° C. for 3 h. Tubular type α-$Al_2O_3$ based porous support was used. The support diameter was 0.6 cm and a length of 6 cm and the average pore diameter was 80 nm. The tubular α-$Al_2O_3$ support was inserted into the solution for a few seconds. After dip coating the tubular support was dried and calcined in air at a temperature of 600° C. for 1 h. A very slow heating/cooling rate was maintained, i.e., 1° C./min. Each membrane was fabricated by repeating this coating method twice. α-$Al_2O_3$/$La_2O_3$-γ-$Al_2O_3$ and α-$Al_2O_3$/$La_2O_3$—$Ga_2O_3$-γ-$Al_2O_3$ intermediate layer were also fabricated by the same procedure.

Synthesis of the $SiO_2$ Nanocrystalline Precursor for the Top Layer with the Sol-Gel Method In this study, the silica sols were synthesized with the single-step hydrolysis process. The degree of hydrolysis and condensation was varied by changing the amount of catalyst, the amount of water, and the aging time of the sol at room temperature. TEOS (tetraethyl orthosilicate) was hydrolyzed and condensed in an ethanol solution mixed with known amounts of water. 8.34 g of TEOS was added to a mixture of 50 g of ethanol, followed by hydrolysis and condensation for 12 h. Additional water was added to bring the total weight to 500 g. The pH of the sol solution was adjusted to 1.2 by the addition of 2.0 g of $HNO_3$, and the mixture was subjected to another 12 h condensation.

Microporous Membrane (Top Layer) Fabrication

Each $SiO_2$ colloidal sol (0.1 M) was dip-coated on top of the α-$Al_2O_3$/γ-$Al_2O_3$ and α-$Al_2O_3$/$La_2O_3$—$Ga_2O_3$-γ-$Al_2O_3$ intermediate layer and fired for 1 h at 600° C. in air with a heating and cooling rate of 0.5° C./min. The whole process of dipping and calcining was repeated once to repair any defects in the first silica membrane layer. $SiO_2$ membranes were also fabricated by using the same procedure.

Characterization

Powders X-ray diffraction (XRD) patterns were collected by using an X-ray diffractometer (Miniflex, Rigaku). The X-ray patterns were obtained with a monochromator over a diffraction angle range 2θ from 10° to 80° at a scan rate of 3°/min by using Cu Kα radiation at 40 key and 100 mA. Particles size and surface area of the powders were also determined by laser diffraction method (Nikkiso, Microtrac HRA 9320-X100/UPA 9340) and Brunauer-Emmett-Teller (B.E.T.) nitrogen adsorption technique (Coulter, Omnisorp 360), respectively. FT-JR spectrometer of Herschel FT/IR-610, JASC Corp was used to obtain FTIR spectra. The samples were measured by the KBr disk-method. The pore-size distributions of the powder samples was measured by $N_2$ sorption isotherms (Micromeritics, ASAP 2000). A JEM-3000F (300 kV, JEOL Co., Tokyo, Japan) was used for the HRTEM images. EDS data were collected for the chemical compositions of the powder and membrane samples.

Hydrothermal Treatment at 500° C.

The hydrothermal treatments of the γ-$Al_2O_3$ and LaA (lanthanum oxide and γ-$Al_2O_3$) powder samples were performed by using a Teflon-lined stainless-steel autoclave and maintaining a molar $N_2$:$H_2O$ feed ratio of 1:3. The powder samples were exposed in the autoclave to $N_2$/steam at 500° C. The $N_2$ gas permeabilities of the mesoporous γ-$Al_2O_3$ and microporous membranes were measured at 500° C. under hydrothermal conditions. The hydrothermal treatments of the membranes were performed under $N_2$:$H_2O$ steam flow with a feed ratio of 1:3 at 500° C. The steam flow was halted at specific time intervals and then the permeances were measured. A water reservoir was maintained at 80° C. to generate steam. All samples were pre-heated at 600° C. for 1 h.

Measurements of Gas Permeance Under Dry and Wet Conditions

The gas permeances were determined according to our previous report. The temperature dependences of the single gas permeances (He, $H_2$, Ar, $N_2$, and CO) were determined for the temperature range 100-500° C. More than five measurements were performed and the average value was recorded.

Results and Discussion

Structural Characterization

Figures 3A, 3B:
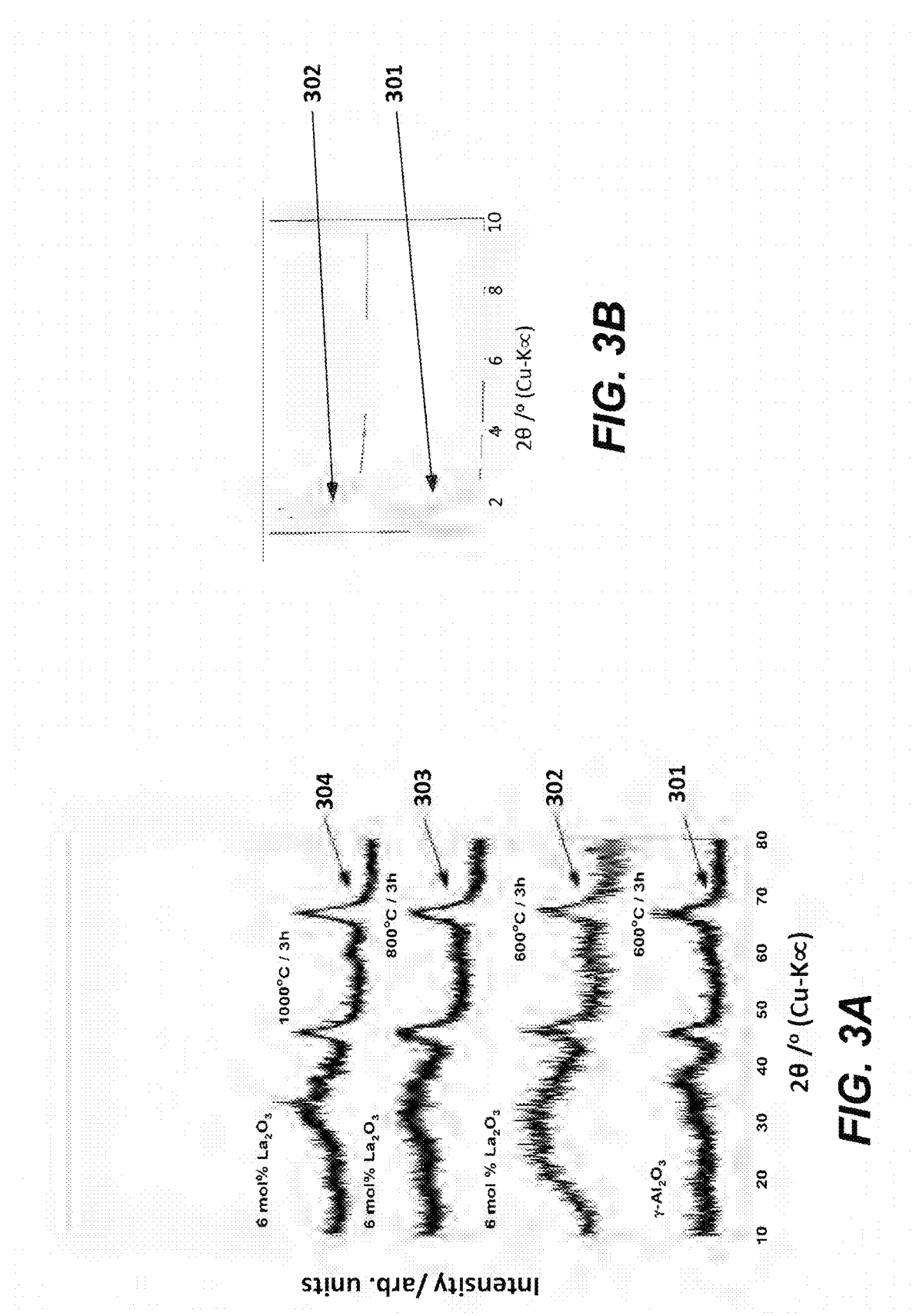
FIG. 3A is a graph of an XRD pattern of variations of a semi-porous composite membrane.
FIG. 3B is an expanded graph of an XRD pattern of variations of a semi-porous composite membrane.
Figure 4:
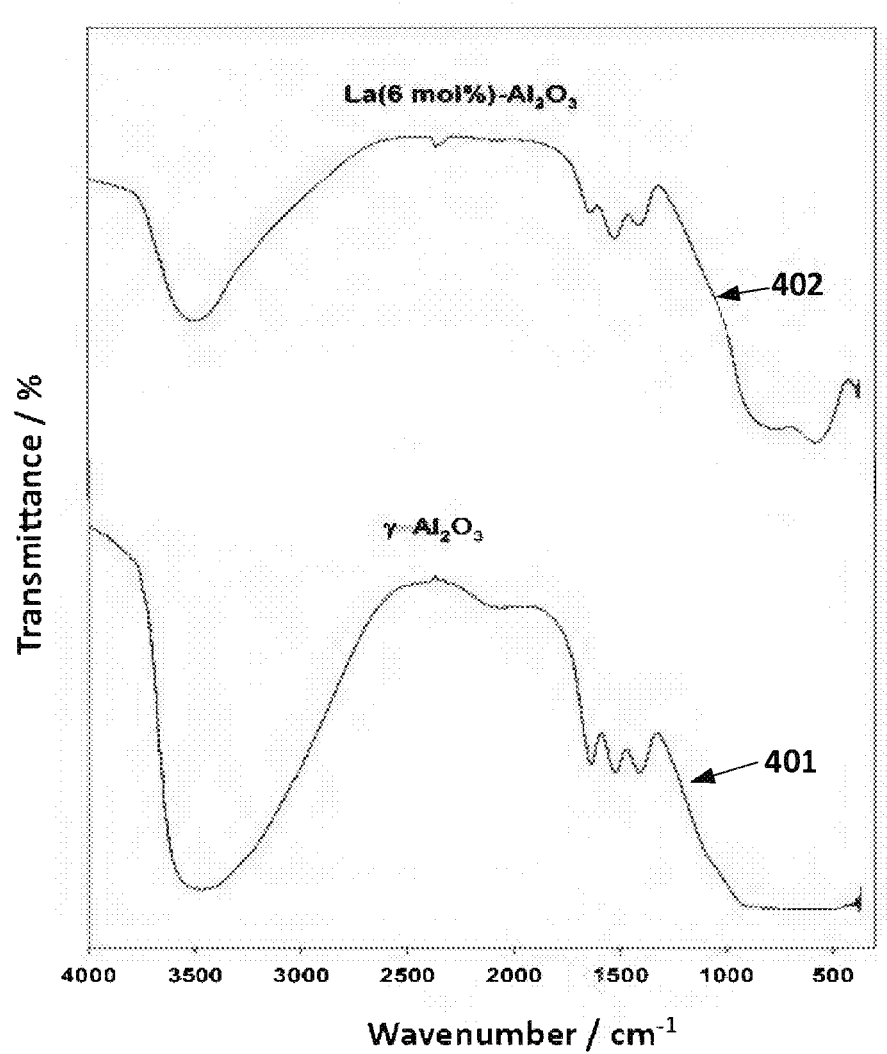
FIG. 4 is a FTIR absorption spectra of variations of a semi-porous composite membrane.

The XRD pattern (FIG. 3A) of undoped γ-$Al_2O_3$ contains several weak XRD peaks assigned to γ-$Al_2O_3$ (JCPDS Card 50-0741). The weak peaks are due to particle-size broadening, which produces particles that are less crystalline. No XRD peaks of crystalline phases other than γ-$Al_2O_3$ are present in the pattern for $La_2O_3$-doped γ-$Al_2O_3$ 302, as can be seen in FIG. 3B. However, the band from 2θ=15° to 40° in this XRD pattern implies the presence of a phase containing $La_2O_3$. Undoped γ-$Al_2O_3$ 301 has a somewhat amorphous structure; after the addition of 6 mol % $La_2O_3$ 302, it becomes more amorphous (FIG. 3B). FIG. 3A shows the XRD patterns in the 2θ range 10° to 80° for $La_2O_3$-doped (6 mol %) γ-$Al_2O_3$ 304 after heating at temperatures up to 1000° C. No diffraction peaks due to $La_2O_3$-containing phases 303 were observed even after heat treatment at 800° C. for 3 h. No $La_2O_3$ phase was detected during scanning, which could be due to the amorphous state of the $La_2O_3$ sample, or mean that the particles are very well dispersed in the γ-$Al_2O_3$ phase. Research has previously observed a high contrast of $Al_2O_3$ small particles after the addition of 2.65 wt. % $La_2O_3$ into an $Al_2O_3$ sample calcined at 500° C. in air. After heat treatment at 1000° C. for 3 h, the intensities of the peaks increase and a small sharp peak near 34° 304 is observed (FIG. 3A). Note that $La^{3+}$ ions do not penetrate either the tetrahedral or octahedral sites of the γ-$Al_2O_3$ spinel structure because their ionic radius (0.104 nm) is larger than that of the $Al^{3+}$ ion (0.051 nm). The low-angle diffraction patterns of both γ-$Al_2O_3$ and LaA gave one single peak after calcination at 600° C. 1 h in air, which is indicative of a mesostructured (FIG. 3A). FTIR absorption spectra of the γ-$Al_2O_3$ 401 and LaA 402 (FIG. 4) samples were recorded by using the KBr technique at room temperature. The samples were calcined at 600° C. for 1 h in air. The Al—O stretching band was observed between 1000 and 400 $cm^{-1}$ in absorption spectra of the γ-$Al_2O_3$ 401. The bending of molecular water showed a band at 1630 $cm^{-1}$. The chemically adsorbed impurities such as $CO_3^{2-}$, $HCO^{3-}$, $CO_2$, and CO, which are very difficult to remove, even after heating to a temperature of 800° C. showed three small bands between 1600 and 1450 $cm^{-1}$. The band between 2860 and 2960 $cm^{-1}$ in the absorption spectra of the γ-$Al_2O_3$ 401 and LaA 402 is assigned to H—C stretching. The large broad band at 3460 $cm^{-1}$ is characteristic of bonded hydroxyl groups. This band could be isolated OH groups and/or stretching vibrations of adsorbed water molecules. At room temperature, the determination of all these superimposed bands may be difficult. The overall features of the two samples are very similar.

Thermal Analyses

Figure 5A:
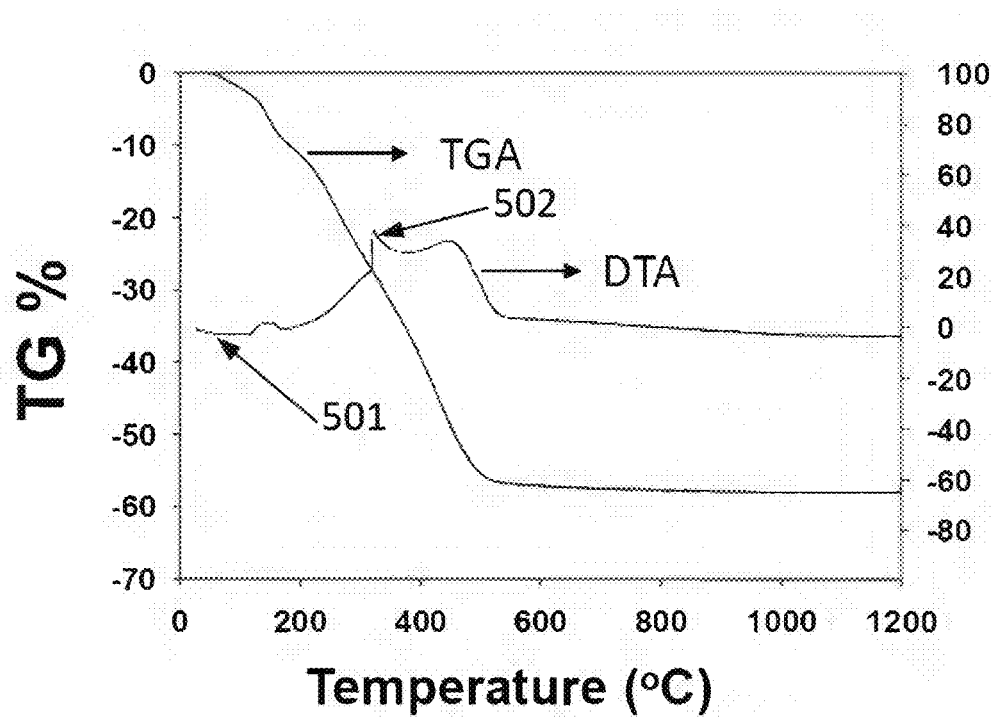
FIG. 5A is a thermogravimetric analysis and differential thermal analysis of variations of a semi-porous composite membrane.
Figure 5B:
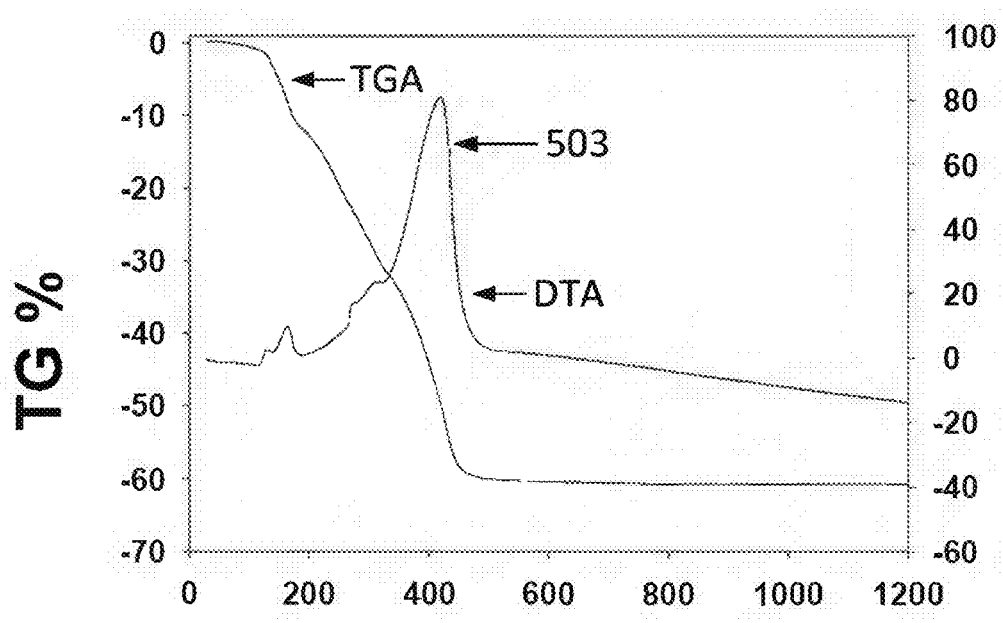
FIG. 5B is a thermogravimetric analysis and differential thermal analysis of variations of a semi-porous composite membrane having PVA.

FIG. 5A and FIG. 5B show the thermal analyses of the γ-$Al_2O_3$ (FIG. 5A) and LaA (FIG. 5B) samples. Thermal analyses were performed with and without the addition of PVA. The addition of PVA reduces the drying and calcination times significantly. Further, the addition of PVA does not alter the membrane pore structure. Moreover, the weight losses of γ-$Al_2O_3$ and LaA are not affected significantly by the addition of PVA to the boehmite solution. The physical desorption of water was observed below 110° C. for both γ-$Al_2O_3$ and LaA samples. There are three major weight losses evident in the Thermogravimetric-Differential Thermal Analysis (TG-DTA) curves of the samples. The largest loss of weight arises between 200° C. and 480° C. A total weight loss of 59 wt. % was observed when the γ-$Al_2O_3$ gel was heated from room temperature to 540° C. FIG. 5A. The weight losses observed after the addition of PVA are nearly identical. Therefore, all the characterizations were performed after heat-treated at 600° C. for 1 h in air. After the addition of $La_2O_3$, the weight loss trend was very similar. The same weight loss was observed slightly at lower temperature in the case of LaA (FIG. 5B). An endothermic peak is evident at 114° C. 501 in absence of PVA for both γ-$Al_2O_3$ and LaA samples. This peak might be due to the vaporization of water from organic solvent and/or organic compounds. The organic compounds were formed might be due to the gelation reactions of ATSB. This peak does not appear after the addition of PVA. FIG. 5A shows two exothermic peaks at 256° C. (502) and 400° C. (503) are probably due to the oxidative combustion and decomposition of organic compounds respectively. A small exothermic peak at 1097° C. is also present, which could be due to the formation of α-$Al_2O_3$. This small peak does not appear after the addition of PVA. In the case of the LaA sample, the exothermic peak near 400° C. is quite sharp.

Figure 6B:
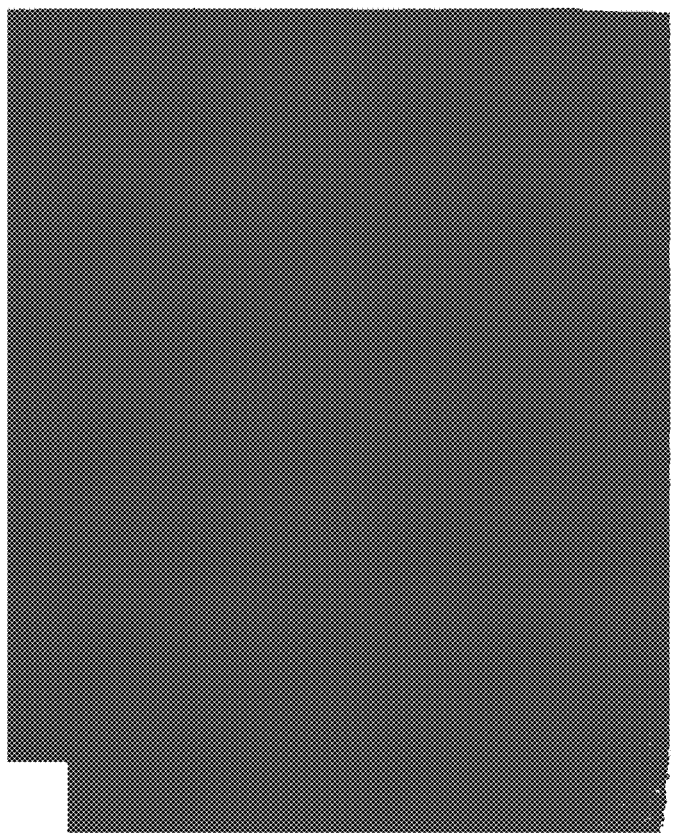
FIG. 6B is a bright-field image of γ-$Al_2O_3$ and $La_2O_3$ on semi-porous composite membrane.
Figure 6A:
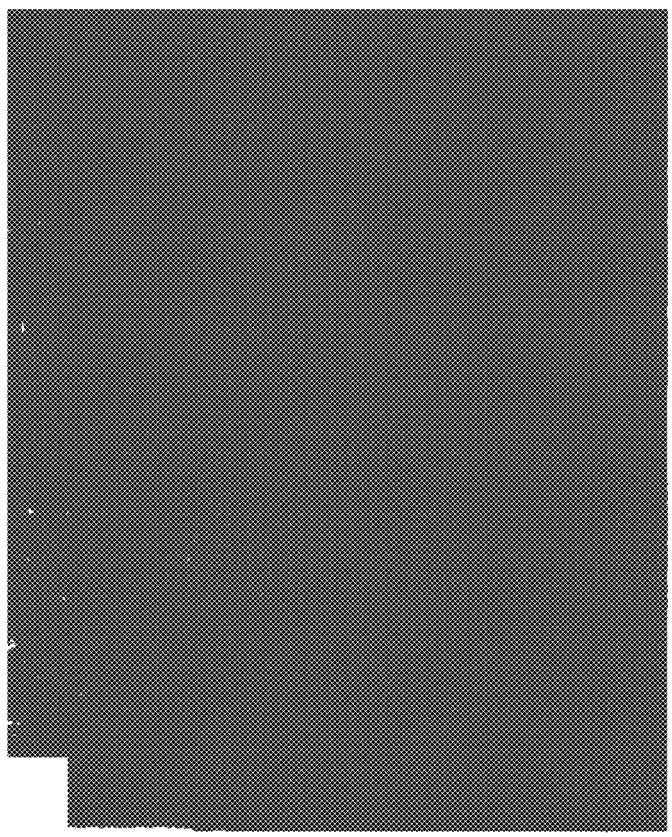
FIG. 6A is a bright-field TEM image of γ-$Al_2O_3$ powder on semi-porous composite membrane.
Figure 7B:
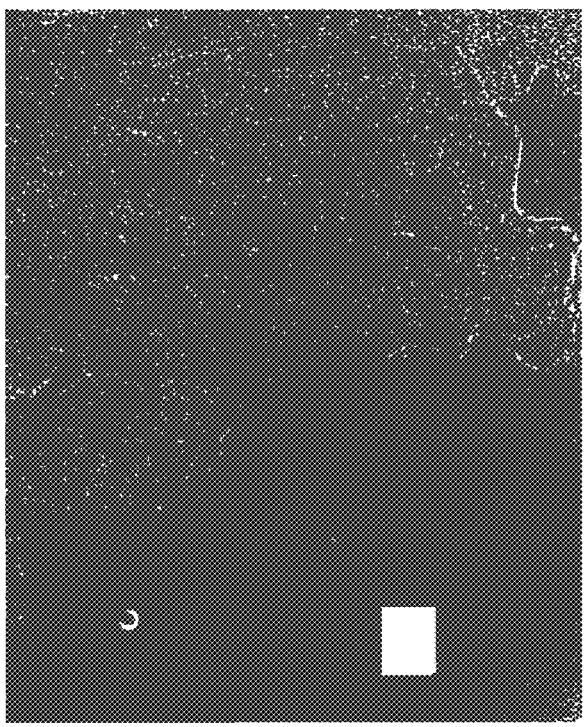
FIG. 7B is an HRTEM image of γ-$Al_2O_3$ and $La_2O_3$ on semi-porous composite membrane.
Figure 7A:
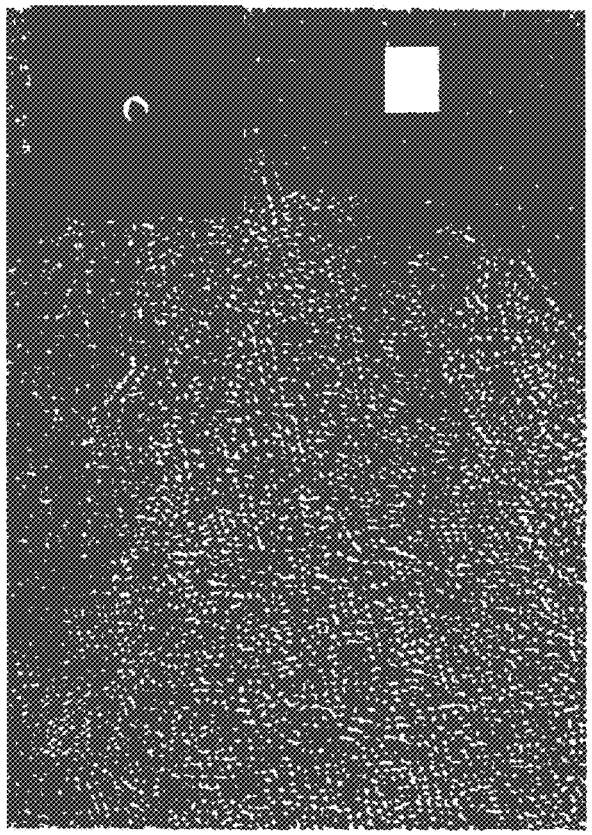
FIG. 7A is an HRTEM image of γ-$Al_2O_3$ powder on semi-porous composite membrane.

To investigate the morphologies and/or microstructures of the precursor-derived γ-$Al_2O_3$ and LaA powders, typical bright-field TEM analyses were conducted for the powder samples heat-treated at 600° C. for 3 h in air. Both materials consist mainly of nanoparticles with non-uniform sizes and exhibit disordered mesopore structures due to homogeneous aggregation. The powder morphology of γ-$Al_2O_3$ has the appearance of a very fibrous cloud FIG. 6A. A slight reduction in the contrast in the micrograph after the addition of $La_2O_3$ into γ-$Al_2O_3$ is observed in FIG. 6B. There is no peak for $La_2O_3$ in the XRD pattern, so it may be concluded that the La crystallites are surrounded by less crystalline γ-$Al_2O_3$. The HRTEM image of the γ-$Al_2O_3$ powder reveals that the particles are tiny rod-like grains with a width of approximately 5 nm (FIG. 7A). The HRTEM image in FIG. 7B shows crystallites with a size of approximately 5-10 nm, and it appears that $La_2O_3$ is homogeneously distributed within the $Al_2O_3$ matrix. (111) Facets are evident on the grain surface, and typical diffuse ring patterns assigned to γ-$Al_2O_3$ (400) and (440) are present in the SAED pattern (see the inset in FIG. 7A). In contrast, an undefined shape and low crystallinity are evident (see the inset in FIG. 7B) for $La_2O_3$-doped γ-$Al_2O_3$, which is in agreement with the near-amorphous results obtained in the XRD analysis. The SAED pattern of the LaA sample (see the inset in FIG. 7B) contains two primary γ-$Al_2O_3$ reflections. The transformation of boehmite into alumina is a topotactic reaction in which the final γ-alumina lattice can be the same as the lattice of the original material. After the addition of $La_2O_3$ into the precursor, changes occur in the morphology of the boehmite. The following section provides more details of this structural evolution. In addition, our X-ray elemental mapping image of $La_2O_3$-doped γ-$Al_2O_3$ confirms that La is homogeneously mixed into the alumina matrix. These results strongly suggest that the presence of lanthanum species on the surface of alumina decreases the rate of surface diffusion of alumina species during grain growth.

Comparisons of Structure and Surface Morphology Under Dry and Wet Conditions

The proper application of γ-$Al_2O_3$ in specific field can be understood by its textural properties, such as pore volume, surface area, PSD and its acid/base properties, which are connected to local microstructure, surface chemical composition, and phase composition. The structural characterization of γ-$Al_2O_3$ was performed by IR spectroscopy, NMR spectroscopy, XRD, TEM, and BET adsorption. In addition two new technologies i.e., neutron vibrational spectroscopy and prompt-gamma activation analysis has been reported. Although many kinds of experimental and computational studies were performed, an acute debate still exists about the structure of γ-$Al_2O_3$ and its hydrothermal and chemical stability.

Figure 8:
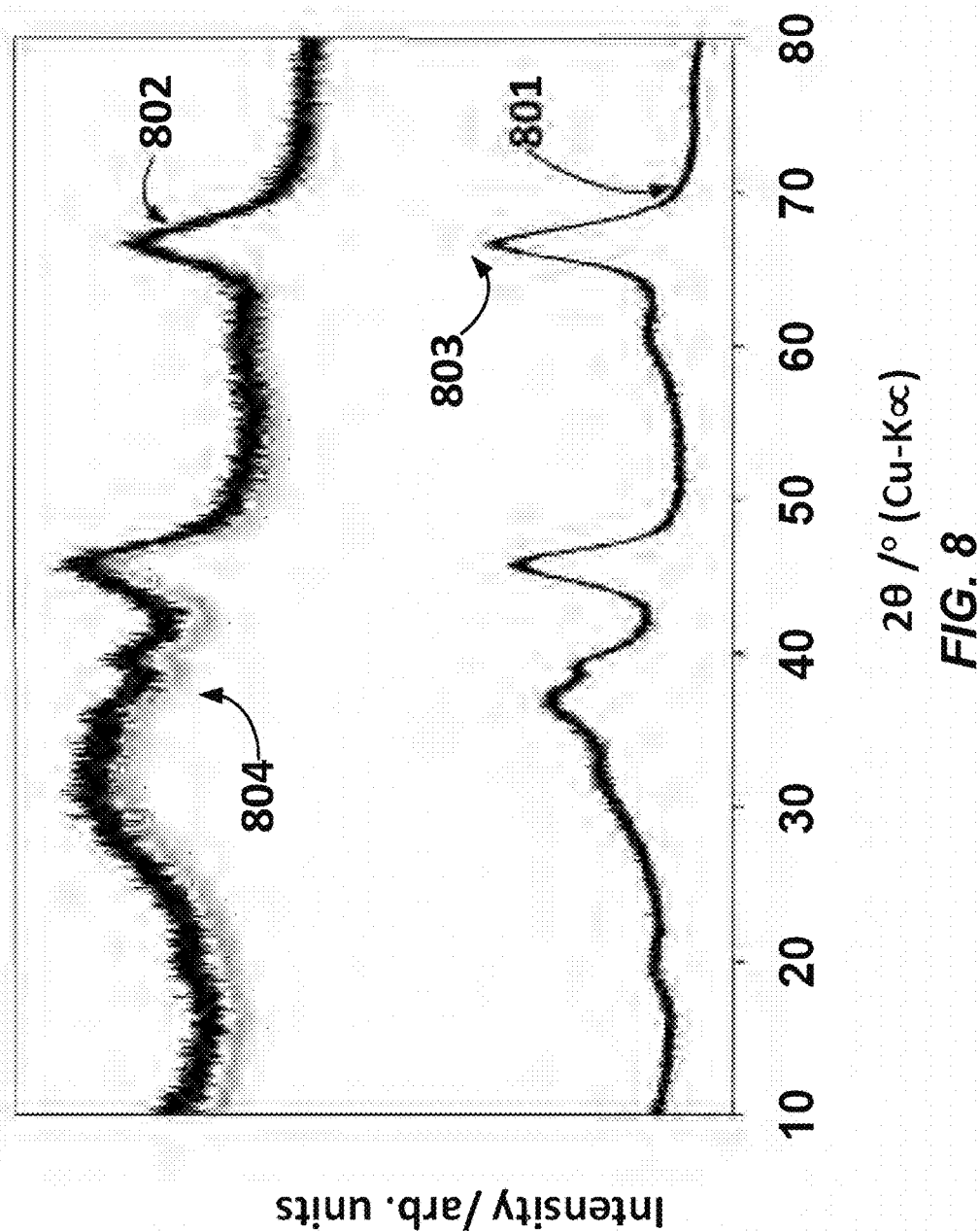
FIG. 8 is an XRD pattern of powdered samples of the semi-porous composite membrane before and after hydrothermal treatment.

The powder samples and the supported γ-$Al_2O_3$ and LaA membranes were characterized by using XRD and PSD and by determining their gas permeation properties under dry and wet conditions. The results were compared and correlation between the results and TEM observations was attempted. FIG. 8 shows the XRD patterns of the powdered samples before and after hydrothermal treatment. The peak intensities of γ-$Al_2O_3$ 801 increase slightly after hydrothermal treatment at 500° C., which indicates an increase in its crystallinity (FIG. 8). In contrast, for La-doped-γ-$Al_2O_3$ the peak height is almost the same and/or slightly decreased after hydrothermal treatment 802 (FIG. 8). The dotted lines 803 and 804 in FIG. 8 are for the hydrothermally treated samples. The PSDs of the γ-$Al_2O_3$ and LaA samples under dry and wet conditions were investigated. The $N_2$ adsorption/desorption isotherms of the γ-$Al_2O_3$ and LaA samples were recorded. According to the BDDT classification, γ-$Al_2O_3$ structures produce an isotherm of type IV. An isotherm similar to type IV with an H1-type hysteresis loop at $P/P_o$=0.4 to 0.8 was also observed for LaA [results not shown]. The corresponding curve is due to a mesopore structure with a narrow pore size distribution. After hydrothermal treatment, the isotherms of the γ-$Al_2O_3$ and LaA samples indicate reduced pore volume and their hysteresis loops are significantly reduced [results not shown]. The pore size distribution was also calculated by nano-permporometry for supported γ-$Al_2O_3$ and LaA membranes samples. The permporometry experiments were performed directly on the membrane. Somewhat broad with little shoulder type peak with high pore volume was observed at 4-4.5 nm. The peak position shifted toward a higher value and the peak height decreased little bit after hydrothermal treatment. The PSD of γ-$Al_2O_3$ powders measured by applying the Barrett-Joyner-Halenda method to the desorption branch of the isotherm and showed very sharp peak at 3.5 nm with low pore volume. The peak height decreased significantly and shifted toward higher value after hydrothermal treatment. Therefore, it may be concluded that the PSD of γ-$Al_2O_3$ powders and membranes are not similar.

Figure 9:
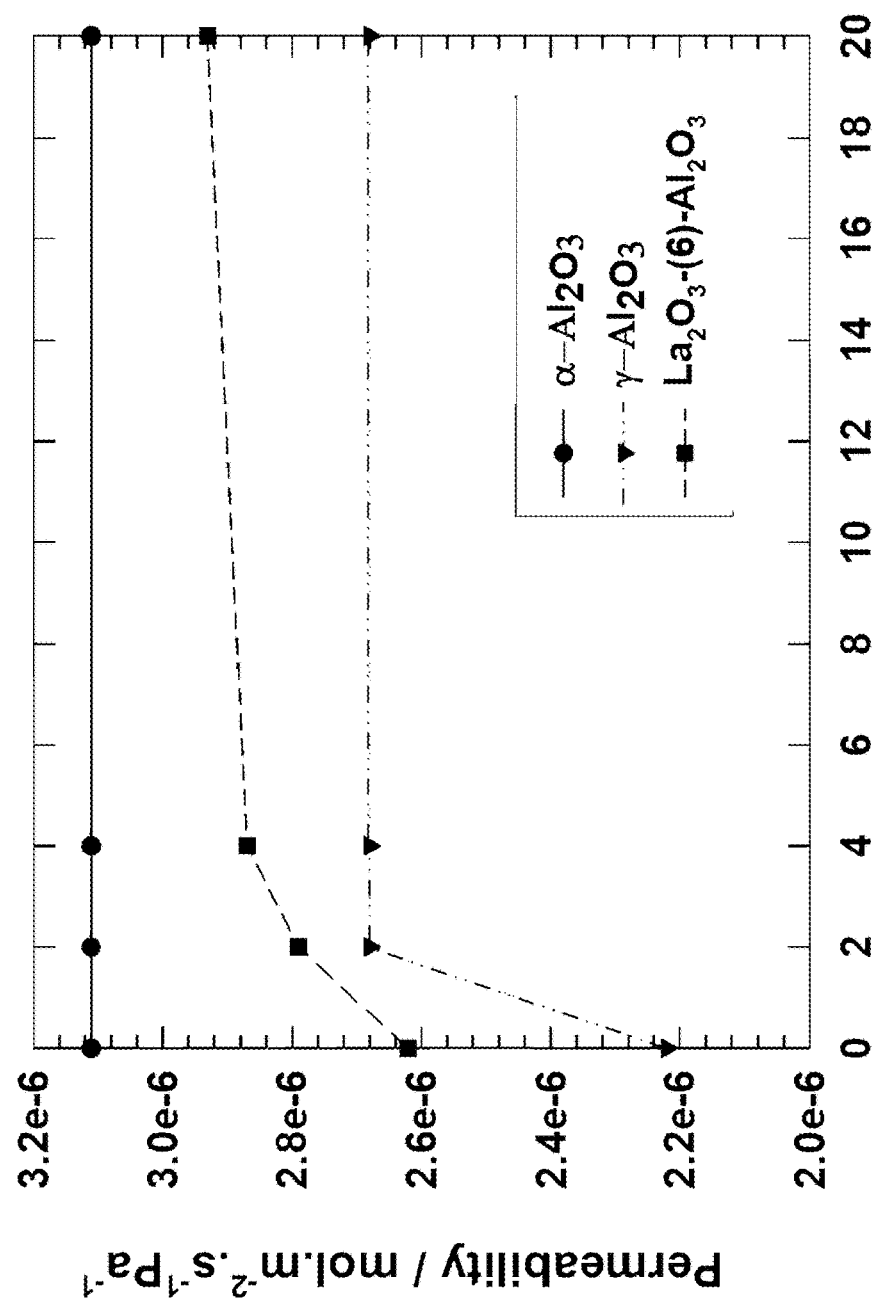
FIG. 9 is a graph of permeance data for three variations of a semi-porous composite membrane.

The $N_2$ gas permeation performances of the samples under dry and wet conditions were investigated. The TEM images were obtained after the 20 h gas permeation experiments i.e., TEM observations after hydrothermal treatment. The $N_2$ gas permeance performances of undoped γ-$Al_2O_3$ and LaA membranes were investigated. The $N_2$ gas permeances do not vary for 20 h at 500° C. in the absence of steam. The permeance data fit on a straight line, so the dry test results were not included in FIG. 9. FIG. 9 shows the $N_2$ permeances under hydrothermal conditions with a 75% steam stream. The first measurement at 0 h was obtained under dry conditions. The $N_2$ gas permeance of $\gamma$-$Al_2O_3$ significantly increases over the first 2 h in steam. The permeance of the LaA membrane increases at a slightly lower rate within the first 2 h and further increases up to 20 h at a very slow rate. Neither system is stable under wet conditions, which is in good agreement with the PSD volume reduction. The thicknesses of the prepared $\gamma$-$Al_2O_3$ and LaA membranes were 3-3.5 μm.

Of particular importance to the morphology of these systems is the arrangement of the interparticle porous networks. In fact, the morphology of the $\gamma$-$Al_2O_3$ nanoparticles is of significant interest because the catalytic activity is highly dependent to the structure of the exposed crystalline faces. Previously, it was reported that the surface contrasts of exposed crystalline (111) surface facets of $\gamma$-$Al_2O_3$ nanoparticles obtained via TEM observations. It is important to note that the characterization of $\gamma$-$Al_2O_3$ is difficult because of the problems that arise in the preparation of a single crystal of $\gamma$-$Al_2O_3$, as required for structural analysis. FIG. 10 through FIG. 14 show cross-sectional views of supported $\gamma$-$Al_2O_3$ and LaA membranes before and after hydrothermal treatment. FIG. 10A shows bright field images of a $\gamma$-$Al_2O_3$ membrane near the top surface and at the bottom (FIG. 10B) near the tubular support. Acicular particles that are 5 to 10 nm and have a worm-like structure can be seen and their arrangement is slightly zigzag, particularly in the second layer 1001. A lamellar-type porous structure is also visible in FIG. 10A and FIG. 10B. After hydrothermal treatment, the tiny particles in the second layer 1001 become more compact than in the first layer 1002 (FIG. 11A). The $\gamma$-$Al_2O_3$ sol did not penetrate into the support layer, as shown in FIG. 11B. The formation of a physically solid layer must occur very rapidly so that the suspension of the particles does not penetrate into the pores of the tubular support. $\alpha$-$Al_2O_3$ prepared through the dehydration of bayerite [$\alpha$-Al(OH)$_3$] or gibbsite is not a suitable support material because the majority of the pore volume is present within very narrow pores. A macro-porous tubular $\alpha$-$Al_2O_3$ support with 45% porosity and a very smooth top surface was employed; the pseudo-boehmite ($\gamma$-AlOOH) consisted of tiny needles, which has three advantages: better adherence to the top layer, the sol does not penetrate into the support, and crack-free and thin membranes are obtained. The tubular support was dipped into a boehmite solution containing PVA. It seems that penetration of the solution into the pore system proceeds slowly, which produces a homogeneous thin layer on top of the support. Some particles are slightly agglomerated after the hydrothermal treatment (FIG. 11B).

Figures 12A, 12B, 12C:
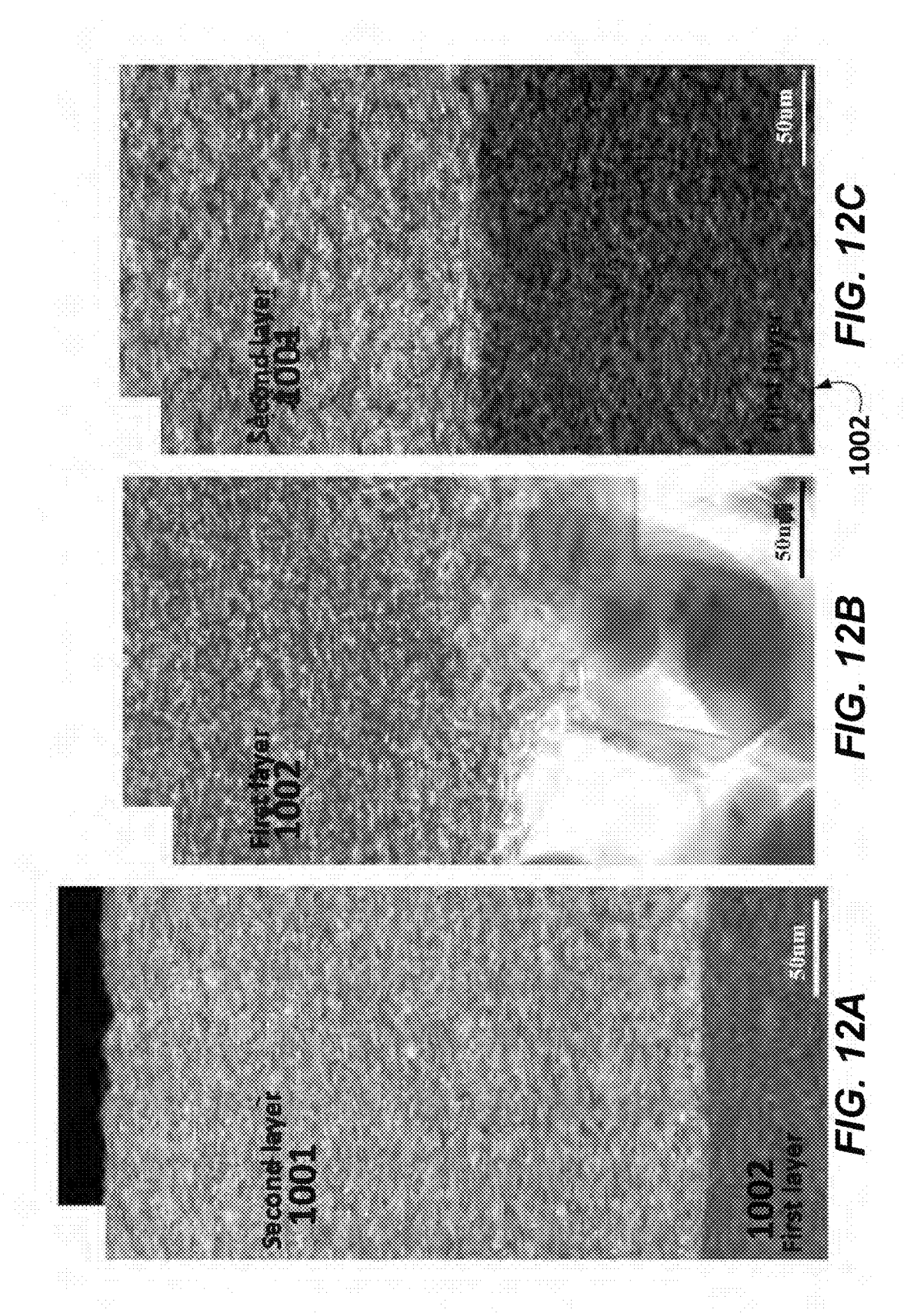
FIG. 12A is a bright-field TEM image of a semi-porous composite membrane including $La_2O_3$ and γ-$Al_2O_3$, near the outer layer after hydrothermal treatment.
FIG. 12B is a bright-field TEM image of a semi-porous composite membrane including $La_2O_3$ and γ-$Al_2O_3$, near a base supporting substrate after hydrothermal treatment.
FIG. 12C is a bright-field TEM image of a semi-porous composite membrane including $La_2O_3$ and γ-$Al_2O_3$ between a base supporting substrate and an intermediate layer after hydrothermal treatment.

A clear morphological difference was observed upon the addition of $La_2O_3$ into $\gamma$-$Al_2O_3$. This difference is clearly visible for the membrane and powder samples. Many long and thin fibers with lengths ca. 50-100 nm can be seen in the second layer 1001 (FIG. 12A). It seems that the thin worm-like particles of $\gamma$-$Al_2O_3$ become thinner and a fine cotton or jute fiber-like morphology is formed upon the addition of $La_2O_3$ into $\gamma$-$Al_2O_3$. Further, the first layer 1002 particles are thicker and darker after the addition of $La_2O_3$ (FIG. 12B). The TEM images in FIG. 12B shows that the thick fiber are comprise of many thin fibers with diameters of 10 nm that have formed from two or more fibers, which are probably warped together with diameters of approx. 5 nm. As shown in FIG. 12B and FIG. 12C, the fibers are non-agglomerated nanofibers and have tubular and elongated shapes. FIG. 12C shows the contrast image for the LaA sample. There is also a sharp color contrast between the first lay in FIG. 12B and second layer 1001 FIG. 12A. The SAED patterns of the $\gamma$-$Al_2O_3$ membrane sample contain typical diffuse ring patterns assigned to $\gamma$-$Al_2O_3$ (400) and (440), i.e. two primary $Al_2O_3$ reflections. No diffraction attributable to $La_2O_3$-containing phases is evident [results not shown]. These results are in good agreement with the XRD analyses. Based on the HRTEM nonstructural characterization, we conclude that the significant improvement in the thermal stability is related to the surface modification and low crystallinity of $\gamma$-$Al_2O_3$ that results from the presence of the lanthanum species.

Figures 14A, 14B:
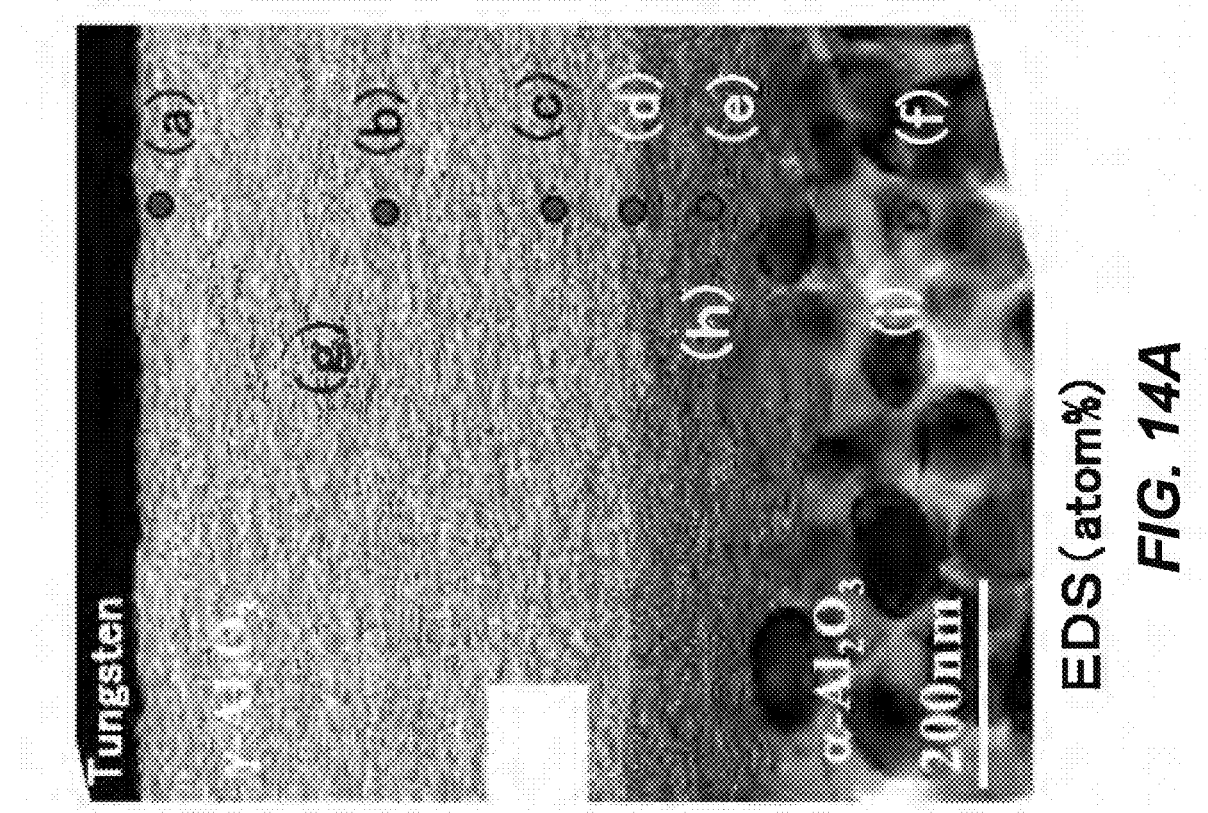
FIG. 14A is an HRTEM image of a cross-section of a semi-porous composite membrane from which energy dispersive spectroscopy (EDS) atom % is obtained for various locations of the membranes in a dry sample.
FIG. 14B is a measurement obtained of EDS atom % from an HRTEM image of a cross-section of a semi-porous composite membrane.
Figures 14C, 14D:
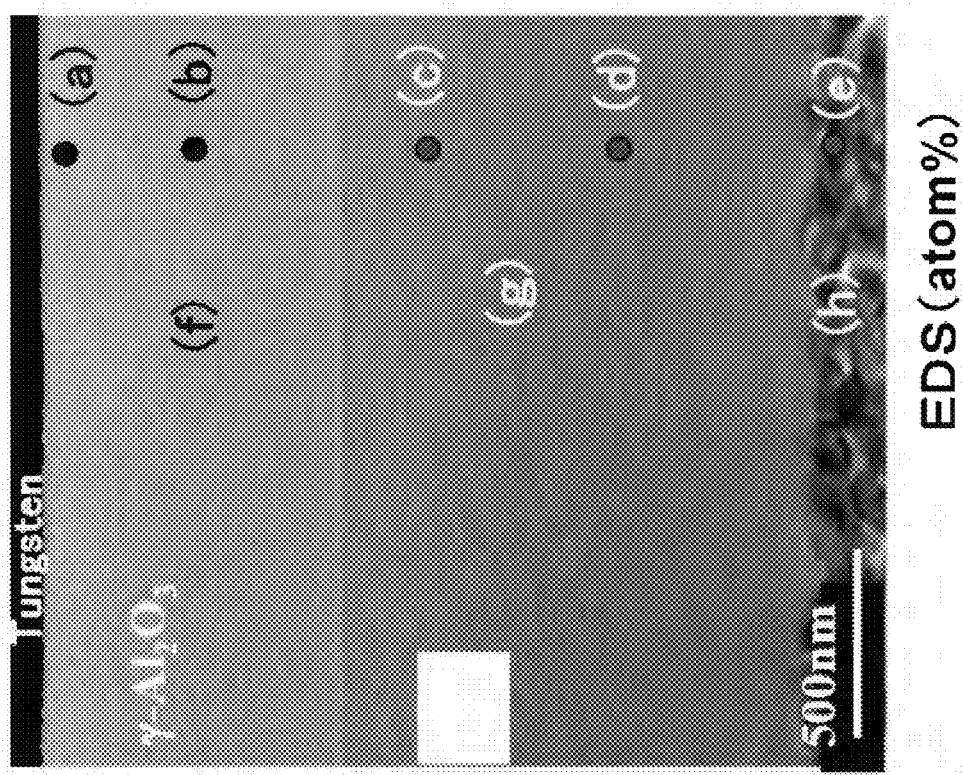
FIG. 14C is an HRTEM image of a cross-section of a semi-porous composite membrane from which energy dispersive spectroscopy (EDS) atom % is obtained for various locations of the membranes in a wet sample after an hydrothermal treatment; [remove the "b" from this figure
FIG. 14D is a measurement obtained of EDS atom % from an HRTEM image of a cross-section of a semi-porous composite membrane.

FIG. 13 shows an HRTEM image of a LaA sample after hydrothermal treatment, which has resulted in a clear morphological change. The fibrous particles are more compact and very tiny white zigzag lines are visible. The thickness of the particles has increased, particularly in the second layer 1001 (FIG. 13A). The first layer 1002 is highly compact and has a dark color. The bright field contrast image for LaA after hydrothermal treatment is shown in FIG. 13C; the first layer 1002 is compact and dark, but in the second layer 1001, the particles are thick and agglomerated. Energy dispersive spectroscopy (EDS) atom % obtained for various locations of the membranes for dry and wet samples are shown in FIG. 14A through FIG. 14D. Only a small percentage of Ca was observed after hydrothermal treatment, and the percentage of Al is reduced (FIG. 14C). After hydrothermal treatment of the $\gamma$-$Al_2O_3$ sample, the Si content was increased and the Ca content was decreased. In the case of LaA, the Si content was increased noticeably whereas the Ca content was decreased slightly by hydrothermal treatment (data not shown). Finally, the morphologies of membranes cross-sections are crucial to PSD control, particularly for dry and wet reaction conditions. After hydrothermal treatment the first layer 1002 was compact but the second layer 1001 showed slightly lose fibrillary type particles. In fact, the morphological characterization results provided useful hints for the selection of coating (single or multiple) criteria for the development of a membrane reactor fabrication.

Gas Permeation Properties

Dry Gas Transport Properties

Usually, the mean pore size of the mesoporous $\gamma$-$Al_2O_3$ intermediate layer was observed in the range of about 3 to 4 nm. Sometimes a small amount of macropores (ø>50 inn) can be exists in the mesoporous $\gamma$-$Al_2O_3$ intermediate layer. This macropores are responsible for the formation of pinholes or cracks in the silica-based membranes. Therefore, it is important to develop technologies for fabricating a fine mesoporous intermediate layer for high-performance molecular-sieve microporous membrane. The $La_2O_3$—$Ga_2O_3$-$\gamma$-$Al_2O_3$ membrane in the composition of La:Ga:Al=6:30:64 mol % showed high hydrothermal stability. Based on above discussion and careful morphological observation and characterization results of $\gamma$-$Al_2O_3$ alone and metal ion doped-$\gamma$-$Al_2O_3$, we have fabricated two type i.e., $\alpha$-$Al_2O_3$/$\gamma$-$Al_2O_3$/$SiO_2$ (AA-$SiO_2$) and $\alpha$-$Al_2O_3$/$La_2O_3$—$Ga_2O_3$-$\gamma$-$Al_2O_3$/$SiO_2$ (ALGA-$SiO_2$) membranes and their gas permeance properties were measured in the temperature range 100-500° C. under dry and wet conditions.

Figure 15A:
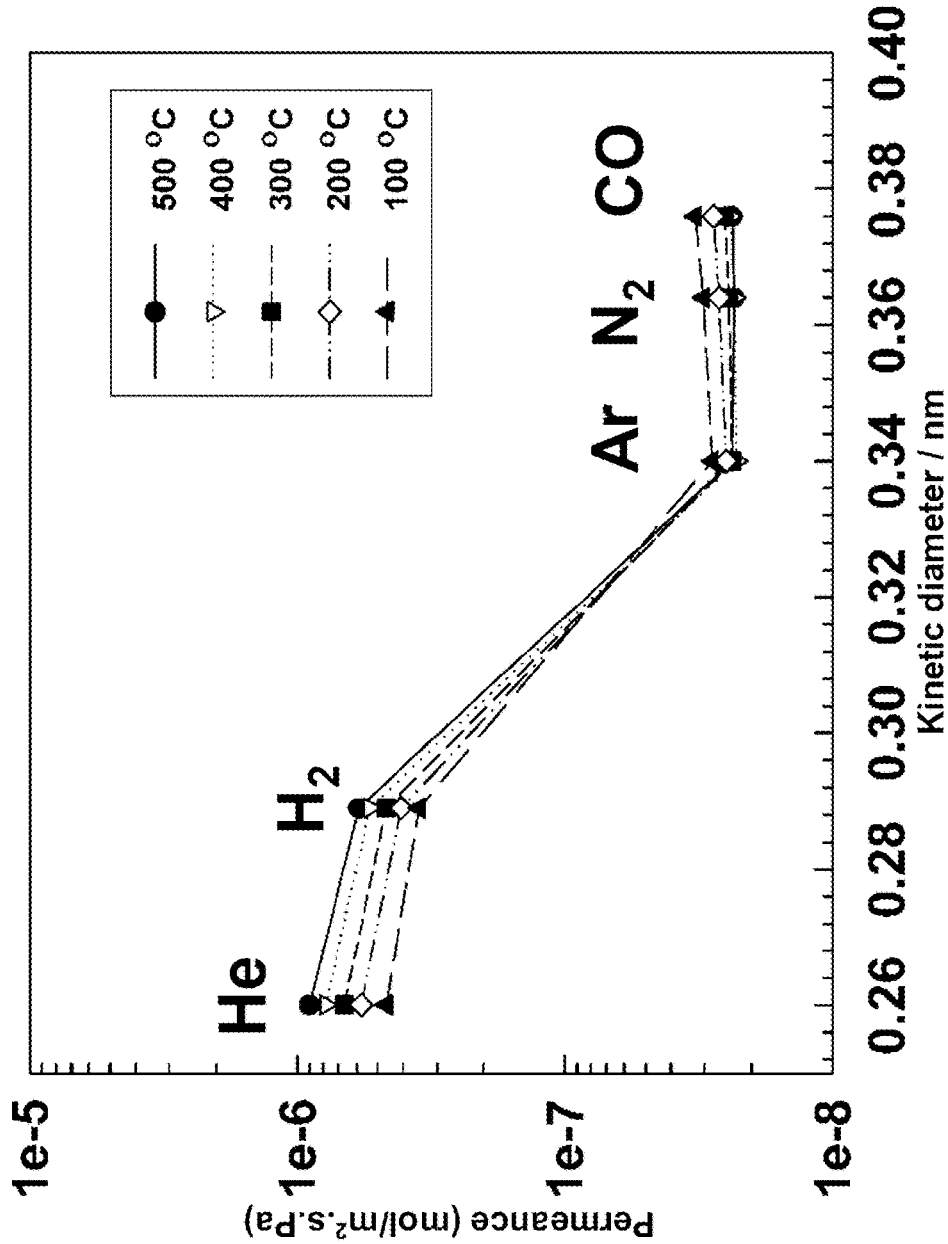
FIG. 15A is a graph of an exemplary analysis of the dependence of the dry gas permeance of He, $H_2$, Ar, $N_2$, and CO on the gas molecule kinetic diameter through a semi-porous composite membrane.
Figure 15B:
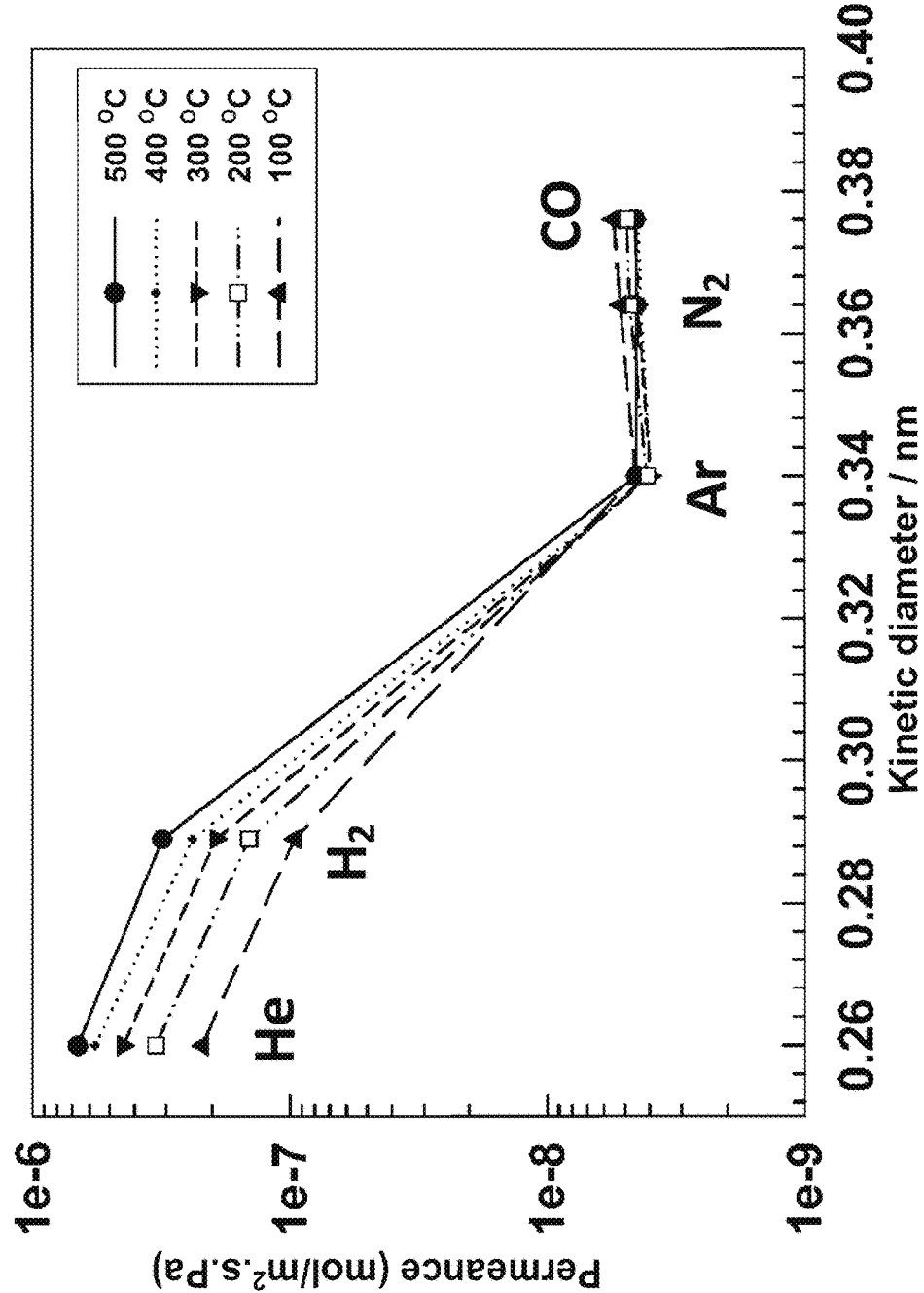
FIG. 15B is a graph of an exemplary analysis of the dependence of the dry gas permeance of He, $H_2$, Ar, $N_2$, and CO on the gas molecule kinetic diameter through a semi-porous composite membrane having $La_2O_3$, $Ga_2O_3$, and $\gamma$-$Al_2O_3$.

FIG. 15A and FIG. 15B shows the dependence of the dry gas permeance of He, $H_2$, Ar, $N_2$, and CO on the gas molecule kinetic diameter through the (a) AA-$SiO_2$ and (b) ALGA-$SiO_2$ membranes. The gas peremances were increased or decreased by the molecular sieving effect. Very low permeances was observed for Ar, $N_2$, and CO, while the same membranes exhibited high permeances for He and $H_2$. It seems that the kinetic diameter of gas molecule of around 0.3 nm dominate a crucial role that govern permeability. The gas permeates rapidly below this value and they do so with difficulty above this value. In the case of AA-SiO$_2$ membranes, the permeances increase insignificantly with temperature only for He and H$_2$ and decrease a little for CO and N$_2$. The permeances of He and H$_2$ are slightly activated for both AA-SiO$_2$ and ALGA-SiO$_2$ membranes. Only N$_2$ and CO permeances can be explained with Knudsen's permeation mechanism. It means few pinholes still left in the membrane through which path the N$_2$-permeation were occurs. FIG. 15A and FIG. 15B show that the permselectivities of both the AA-SiO$_2$ and ALGA-SiO$_2$ membranes with respect to H$_2$/He, H$_2$/Ar, H$_2$/N$_2$ and H$_2$/CO and He/CO increase with increasing temperature. The permselectivity of H$_2$/N$_2$ at 500° C. was determined to be 38 for the AA-SiO$_2$. In contrast, the permselectivity of H$_2$/N$_2$ was found to be 147 for the ALGA-SiO$_2$ membrane. The permeance and Fα (permselectivity) values are in agreement with previous results. The He gas permeance was found to be 6.66×10$^{-7}$ mol·m$^{-2}$·s$^{-1}$·Pa$^{-1}$ at 500° C. with Fα>147 for He/CO (Table 1), whereas other investigators recorded values of 1.6×10$^{-6}$ mol/m$^2$·s·Pa and 43 respectively. AA-SiO$_2$ calcined at 600° C. was found to exhibit Fα=38 of He/CO with a He permeance of 9.01×10$^{-7}$ mol·m$^{-2}$·s$^{-1}$·Pa$^{-1}$ at 500° C.

TABLE 1

H$_2$/He, H$_2$/Ar, H$_2$/N$_2$ and He/CO permselectivities (Fα), for α-Al$_2$O$_3$/γ-Al$_2$O$_3$/SiO$_2$ and α-Al$_2$O$_3$/La$_2$O$_3$—Ga$_2$O$_3$-γ-Al$_2$O$_3$/SiO$_2$ membranes (all membranes calcined at 600° C.), Pressure at permeate side is always 1 bar.

| Temperature ° C. | H$_2$/He | H$_2$/Ar | H$_2$/N$_2$ | H$_2$/CO | He/CO |
|---|---|---|---|---|---|
| α-Al$_2$O$_3$/γ-Al$_2$O$_3$/SiO$_2$ membranes, under dry condition | | | | | |
| 500° C. | 0.65 | 24.96 | 25.39 | 24.96 | 38.18 |
| 400° C. | 0.68 | 23.57 | 23.16 | 22.38 | 32.77 |
| 300° C. | 0.70 | 19.70 | 19.21 | 18.53 | 26.58 |
| 200° C. | 0.71 | 16.45 | 15.45 | 14.73 | 20.84 |
| 100° C. | 0.75 | 12.46 | 11.52 | 10.77 | 14.36 |
| α-Al$_2$O$_3$/La$_2$O$_3$Ga$_2$O$_3$-γ-Al$_2$O$_3$/SiO$_2$ membranes, under dry condition | | | | | |
| 500° C. | 0.48 | 69.27 | 69.57 | 68.80 | 147.34 |
| 400° C. | 0.47 | 60.00 | 55.90 | 53.86 | 129.09 |
| 300° C. | 0.43 | 48.61 | 43.34 | 42.29 | 97.36 |
| 200° C. | 0.44 | 35.21 | 30.25 | 29.38 | 67.35 |
| 100° C. | 0.44 | 21.17 | 18.37 | 17.4 | 39.64 |
| α-Al$_2$O$_3$/La$_2$O$_3$Ga$_2$O$_3$-γ-Al$_2$O$_3$/SiO$_2$ membranes, under hydrothermal condition | | | | | |
| 500° C. | 0.30 | 45.23 | 45.45 | 154.73 | 172.78 |
| 400° C. | 0.27 | 29.25 | 33.91 | 110.44 | 141.22 |
| 300° C. | 0.25 | 20.11 | 22.48 | 81.12 | 101.25 |
| 200° C. | 0.24 | 12.95 | 12.82 | 55.79 | 73.11 |
| 100° C. | 0.28 | 6.96 | 6.87 | 25.69 | 43.80 |

Permeation Performance Under Wet Conditions

In the case of AA-SiO$_2$ membrane, the CO gas permeance increases significantly after hydrothermal treatment. The AA-SiO$_2$ showed high permeance in presence of steam. The presence of pinholes and/or cracks could be the reason for the high permeance, which probably occurred during 20 h membrane performance test under wet conditions. Previously, investigators observed very high permeance for a commercial AA-SiO$_2$ membranes under wet conditions. The H$_2$ gas permeances increase with increases in the duration of the hydrothermal treatment. It is clear that the SiO$_2$ membrane is not a suitable candidate for gas separation membranes. The H$_2$ permeance of the ALGA-SiO$_2$ membrane is 9.09×10$^{-8}$ mol·m$^{-2}$·s$^{-1}$·Pa$^{-1}$ with a H$_2$/CO permeance ratio of 154, whereas those of the SiO$_2$ membrane are 9.01×10$^{-7}$ mol·m$^{-2}$·s$^{-1}$·Pa$^{-1}$ and only 24 respectively (Table 1). The ALGA-SiO$_2$ membranes clearly exhibit higher selectivity than the AA-SiO$_2$ membranes under steam conditions. The large increase in Fα for H$_2$/CO from 68 to 154 (Table 1) for the ALGA-SiO$_2$ membrane might be due the presence of hydrothermally stable intermediate layer La$_2$O$_3$—Ga$_2$O$_3$-γ-Al$_2$O$_3$. Hence the intermediate layer has a highly positive effect on its permselectivity. The ALGA-SiO$_2$ was found to exhibit asymptotically stable permeances with a high selectivity at 500° C. for 20 h in the presence of steam. It has been reported that the thermo-stability of γ-Al$_2$O$_3$ can be increase by adding 6 mol % La$_2$O$_3$. Investigators have previously reported that the Ga$_2$O$_3$-γ-Al$_2$O$_3$ solid solution could retain their catalytic activity in presence of steam. The high steam resistance behaviors might be due to the existence of La$_2$O$_3$ species on the grain surface of the Ga$_2$O$_3$-γ-Al$_2$O$_3$ solid solution, which could contribute to enhance the stabilization of pore growth under hydrothermal conditions, shown in FIG. 16A through FIG. 16G. Therefore, we can assume that the intermediate La$_2$O$_3$—Ga$_2$O$_3$-γ-Al$_2$O$_3$ layer provides mechanical strength to the selective silica top layer. Moreover, we have used α-Al$_2$O$_3$ substrate with smooth surface and a porosity 46%, which might helped to control the pore structure and/or crack formation of La$_2$O$_3$—Ga$_2$O$_3$-γ-Al$_2$O$_3$ intermediate layer.

The present example is a study of γ-Al$_2$O$_3$ membranes with TGA, DTA, FTIR, XRD, and TEM under dry and wet conditions to determine the chemical composition, crystal structure, shape, and size of the particles, and their thermal and hydrothermal behavior. It was established that the present results from XRD, PSD, and gas permeance for these membranes are in good agreement and/or correlation with TEM results. The characteristics of γ-Al$_2$O$_3$ powders cannot be directly correlated with those of supported membranes, particularly after hydrothermal treatment. The weight losses of doped and undoped γ-Al$_2$O$_3$ powders are similar, however, so PSD and morphology differences are significant. The γ-Al$_2$O$_3$ and LaA membrane samples have significantly different morphologies, which may have a large impact on membrane fabrication and pore size control for gas separation. The fabricated AGLA/SiO$_2$ membranes were found to exhibit enhanced hydrothermal stability. In fact, the present example establishes a benchmark in the field of γ-Al$_2$O$_3$-based membrane technology. These results may provide a comprehensive understanding of the impact of the intermediate layer and/or membrane reactor degradation on performance under realistic operating conditions and guide us to formulate an effective strategy to mitigate the degradation by designing membrane/support structures.

The invention claimed is:

1. A membrane reactor, comprising:
 a semi-porous composite membrane in the form of a tube, wherein the semi-porous composite membrane comprises:
 a base supporting substrate comprising α-Al$_2$O$_3$;
 an outer layer comprising silica; and
 an intermediate layer comprising crystalline fibers of α-Al$_2$O$_3$ which are a length of 5-150 nm and at least one of a secondary metal oxide and a synthetic polymer, wherein the intermediate layer is disposed between the base supporting substrate and the outer layer;

wherein the semi-porous composite membrane has a permeance of $4.0 \times 10^{-8}$ mol·m$^{-2}$·s$^{-1}$·Pa$^{-1}$ to $1.0 \times 10^{-6}$ mol·m$^{-2}$·s$^{-1}$·Pa$^{-1}$ for He and $H_2$ from at least one gas of Ar, $N_2$, and CO.

2. The membrane reactor of claim 1, wherein the secondary metal oxide is at least one metal oxide selected from the group consisting of lanthanum oxide, zirconium dioxide, calcium oxide, and gallium oxide.

3. The membrane reactor of claim 1, wherein the base supporting substrate is a porous base supporting substrate.

4. The membrane reactor of claim 3, wherein the porous base supporting substrate comprises pores having an average diameter of 50 nm to 160 nm.

5. The membrane reactor of claim 1, wherein the intermediate layer comprises pores of which 70%-95% of a total number of the pores have a pore size distribution from 2 nm to 70 nm.

6. The membrane reactor of claim 1, wherein the outer layer is a silica membrane.

7. The membrane reactor of claim 6, wherein the silica membrane is a porous silica membrane comprising pores having an average pore diameter of 0.1 nm to 2 nm.

8. The membrane reactor of claim 1, wherein the synthetic polymer is present and is at least one polymer selected from the group consisting of polyvinyl alcohol, polyethylene glycol, polyvinyl pyrrolidone, polyacrylic acid, polyacrylamide, poly(N-(2-hydroxypropyl) methacrylamide, and polyoxazoline.

* * * * *